United States Patent [19]

Ishikawa et al.

[11] Patent Number: 5,484,350
[45] Date of Patent: Jan. 16, 1996

[54] CONTROL SYSTEM FOR VEHICLE AUTOMATIC TRANSMISSION

[75] Inventors: Hiroshi Ishikawa; Hideo Furukawa; Masatoshi Shimizu; Norio Nakauchi, all of Wako, Japan

[73] Assignee: Honda Giken Kogyo Kabushiki Kaisha, Tokyo, Japan

[21] Appl. No.: 295,546

[22] Filed: Aug. 25, 1994

[30] Foreign Application Priority Data

Aug. 31, 1993 [JP] Japan .................................. 5-238896

[51] Int. Cl.⁶ ............................ F16H 59/04; F16H 59/62
[52] U.S. Cl. .................................................. 477/97; 477/120
[58] Field of Search ........................................ 477/97, 120

[56] References Cited

U.S. PATENT DOCUMENTS

| | | |
|---|---|---|
| 4,285,252 | 8/1981 | Yamaki et al. . |
| 4,795,015 | 1/1989 | Hibino et al. ............................ 477/97 |
| 4,943,921 | 7/1990 | Baltusis et al. ......................... 477/97 |
| 4,947,971 | 8/1990 | Tanaka .................................. 477/97 |

FOREIGN PATENT DOCUMENTS 5-17626 3/1993 Japan .

*Primary Examiner*—Dirk Wright
*Attorney, Agent, or Firm*—Armstrong, Westerman, Hattori, McLeland & Naughton

[57] ABSTRACT

A control system of a vehicle automatic transmission in which an engine load and a vehicle speed are detected and used to determine a vehicle acceleration in accordance with the preestablished characteristics. An actual vehicle acceleration is at the same time calculated in response to the detected vehicle speed. The difference therebetween is then calculated and the calculated value is added to a difference calculated earlier to obtain an average therebetween. Five gear shifting scheduling maps, for example one for moderate hill climbing, one for level-road running, one for steep hill descent, are preestablished and in response to the average obtained, one of the maps is selected. A gear shifting is controlled based on the selected map. The actual vehicle acceleration is corrected by the altitude where the vehicle is traveling so as to compensate for the engine output decrease due to the charging efficiency drop.

5 Claims, 27 Drawing Sheets

Predicted acceleration table

Map for level-road running (shift characteristics)

Map for moderate hill climbing (shift characteristics)

FIG. 20
MAPS   0 : Steep hill climbing (SHC)
       1 : Moderate hill climbing (MHC)
       2 : Level-road running (LRR)
       3 : Moderate hill descent (MHD)
       4 : Steep hill descent (SHD)
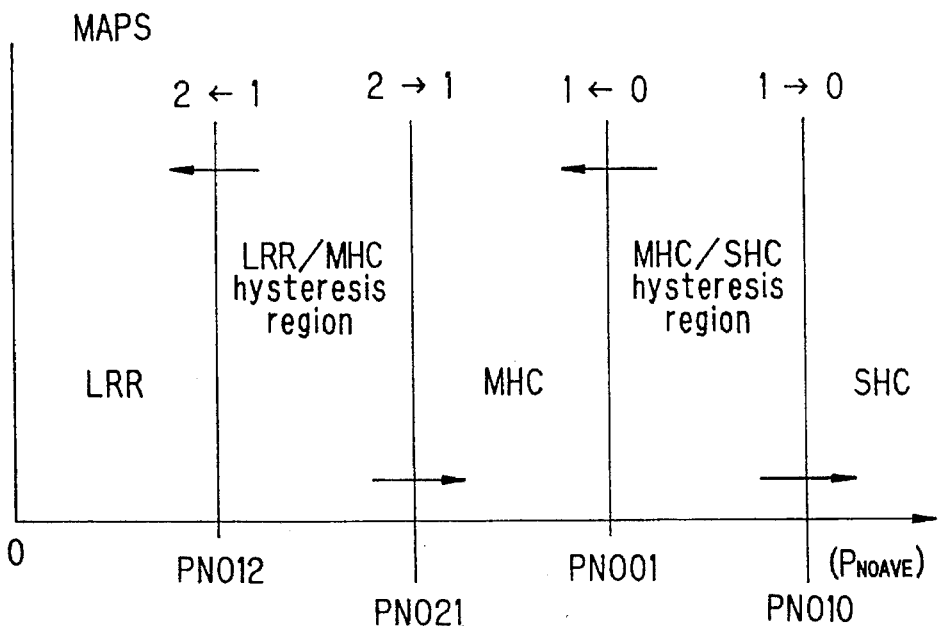
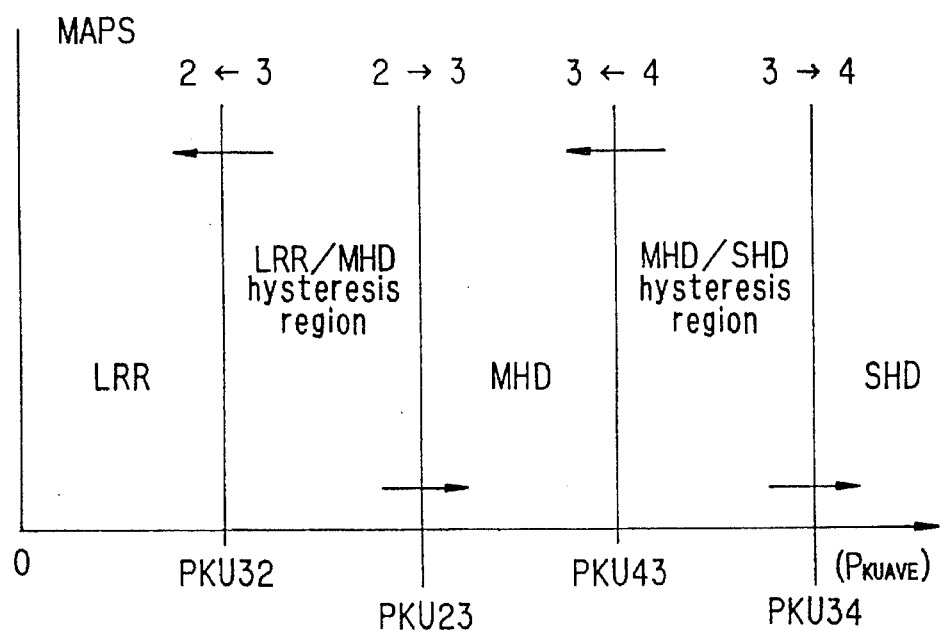

FIG. 21

| | SHC | MHC | LRR | MHD | SHD |
|---|---|---|---|---|---|
| | PN001 | PN010 PN012 | PN021 PKU23 | PKU32 PKU34 | PKU43 |
| Max MAPS  MAPS2 | 0 | 1 1 | 2 2 | 3 3 | 4 4 |
| Min MAPS  MAPS1 | 0 | 0 1 | 2 2 | 3 3 | 4 3 |

| Rule No | Antecedent | | | Conclusion | Meaning of rule |
|---|---|---|---|---|---|
| 1 | V 0~200 | TH 0/8~8/8 | Small R Large | FK 0~2.0 | Keep correction coefficient FK 1.0 no matter how vehicle speed V, throttle opening TH and driving resistance R are. |
| 2 | V (64~133 km/h) | TH (2/8~4/8) | R large | FK small | Make correction coefficient FK small if vehicle speed is moderate (64~133 km/h), throttle is opened moderately (2/8~4/8) and driving resistance is large. |
| 3 | V ← | TH (0/8~1.5/8) | R ← | FK small | Make correction coefficient small if vehicle speed is moderate, throttle is opened slightly (0/8~1.5/8) and driving resistance is large. |
| 4 | V ← | TH (1.5/8~2/8) | R ← | FK small | Make correction coefficient small if vehicle speed is moderate, throttle is opened somewhat moderately (1.5/8~2/8) and driving resistance is large. |

HIGH = Y1' + Y2' + ... Y4'

AREA = X1Y1' + X2Y2' + ... X4Y4'

FK = The center of gravity = AREA/HIGH

CONTROL SYSTEM FOR VEHICLE AUTOMATIC TRANSMISSION

BACKGROUND OF THE INVENTION

1. Field of the Invention

This invention relates to a control system for a vehicle automatic transmission, and more particularly to a control system for a vehicle automatic transmission which always determines the gear ratio optimally during traveling a place at any altitudes.

2. Description of the Prior Art

There have been proposed various vehicle automatic transmission control systems. One example of such a system is described in Japanese Patent Publication No. Sho 59-8698. The assignee proposed a similar system in Japanese Laid-Open Patent Publication No. Hei 5-71626, which was also filed in the United States and matured to Patent (U.S. Pat. No. 5,317,937). In the system there are prepared in advance separate gear shift scheduling maps (gear shift diagrams or programs) for different road profiles—one for level-road driving, another for up-hill driving, and so on, and a parameter indicative of driving resistance such as vehicle acceleration is obtained. Then it is estimated on the basis of the parameter if the vehicle is hill climbing or hill descending and based on the determination, one map is selected among them and a gear ratio is determined in accordance with the selected map. More specifically, the vehicle acceleration is predicted from the vehicle operating conditions including engine output torque and is compared with the actual vehicle acceleration to estimate the degree of hill climbing/descent, i.e, the road profile on which the vehicle is traveling, on the basis of which one among maps most suitable for the traveling condition is selected and a gear ratio is determined on the basis of the selected map.

In these prior art systems, however, the predicted vehicle acceleration is usually determined in advance at a relatively low land on the basis of the vehicle operating conditions including engine output torque and is stored in a computer memory mounted on the vehicle. In other words, no attention is paid to the change in engine output torque at high lands or altitudes. Therefore, when retrieving the predicted vehicle acceleration from the memory and comparing it with the actual vehicle acceleration to estimate the road profile on which the vehicle is traveling, since the engine output torque decreases at altitudes due the charging efficiency drop, there is a possibility that the road profile is estimated steeper than it really is.

It is therefore an object of the invention to provide a control system for a vehicle automatic transmission by obtaining a parameter indicative of the driving resistance to estimate hill climbing or hill descending in order to select one among a plurality of gear shift scheduling maps and then based on the selected map to determine a gear ratio to be shifted to, which overcomes the aforesaid drawbacks of the prior art systems and which is able to correct the parameter indicative of the driving resistance in response to the altitude of a place where the vehicle is traveling such that the gear ratio can optimally be determined no matter where the vehicle is traveling.

Further, the aforesaid drawbacks will be serious as the altitude of a place where the vehicle is traveling increases. Therefore, in views of the drivability, the parameter correction should preferably be conducted at an early time. More specifically, the parameter correction should preferably be sped up with increasing altitude.

It is therefore another object of the invention to provide a control system for a vehicle automatic transmission by obtaining a parameter indicative of the driving resistance to estimate hill climbing or hill descending in order to select one among a plurality of gear shift scheduling maps and then based on the selected map to determine a gear ratio to be shifted to, which overcomes the aforesaid drawbacks of the prior art systems and is able to correct the parameter indicative of the driving resistance in response to the altitude of a place where the vehicle is traveling such that the gear ratio can be optimally determined no matter where the vehicle is traveling and the parameter correction is sped up with the increasing altitude, whereby enhancing the drivability.

SUMMARY OF THE INVENTION

In order to achieve the object, the present invention provides a system for controlling an automatic transmission of a vehicle, having an internal combustion engine connected to said automatic transmission for driving one or more wheels of said vehicle, comprising a hydraulic control circuit connected to said automatic transmission, an electronic control means for controlling said automatic transmission through said hydraulic control circuit, a load detecting means for detecting an operating load on said engine and sending a first output signal representing the engine load to said electronic control means, a vehicle speed detecting means for detecting the vehicle speed and sending a second output signal representing the vehicle speed to said electronic control means, an altitude detecting means for detecting the altitude of a place where said vehicle travels and sending a third output signal representing the altitude to said electronic control means, wherein said electronic control means computes an index indicative of a driving resistance of the vehicle based at least on said second signal, and compares said index with a predetermined reference value stored in a memory in said electronic control means to determine if the vehicle is hill climbing or hill descending, wherein said electronic control means actuating said hydraulic control circuit for carrying out gear shifting control including changing the gear shifting characteristics of said transmission to be suitable for either hill climbing or hill descending based on said determination, and wherein said electronic control means corrects at least one of said index indicative of a driving resistance of the vehicle and said predetermined reference value to be compared therewith in response to said third output signal.

BRIEF EXPLANATION OF THE DRAWINGS

These and other objects and advantages of the invention will be more apparent from the following description and drawings, in which:

FIG. 20 is an explanatory view showing reference values for map selection used in FIG. 19 flow chart;

FIG. 21 is an explanatory view showing the result of selection conducted along the subroutine of FIG. 19 flow chart;

FIG. 29 is an explanatory view of fuzzy production rules to be used in a vehicle speed correction through fuzzy reasoning FIG. 2 flow chart;

DETAILED DESCRIPTION OF THE PREFERRED EMBODIMENTS

Figure 1:
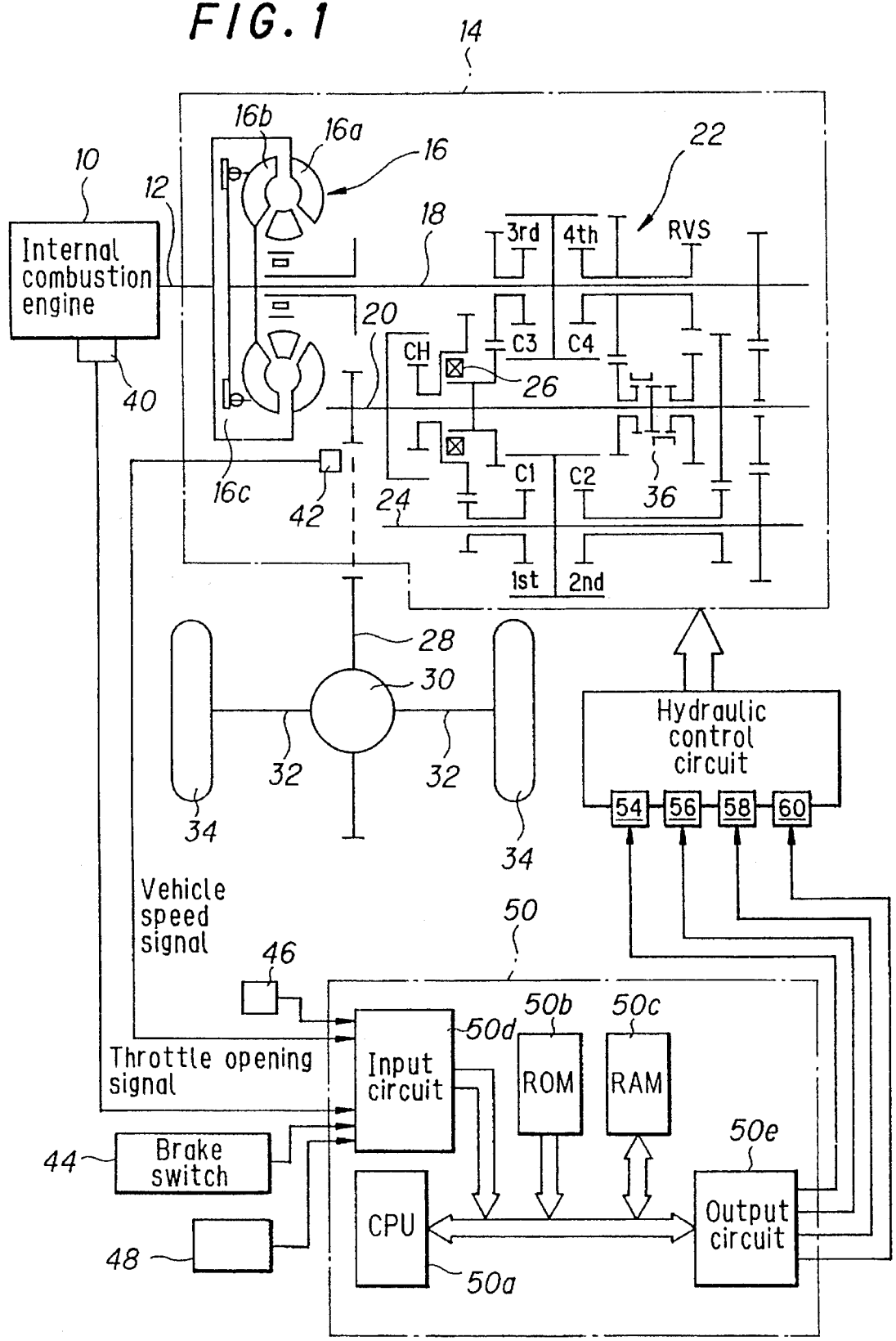
FIG. 1 is an explanatory view showing the overall schematic illustration of a control system of an a vehicle automatic transmission according to the invention.

In the overall schematic illustration of the control system for a vehicle automatic transmission according to the invention shown in FIG. 1, the output of an internal combustion engine 10 for a vehicle is transmitted via a shaft 12 to a transmission 14 wherein it is passed on to a main shaft 18 through a pump impeller 16a and a turbine runner 16b of a torque convertor 16. A gear unit 22 with four forward speeds and one reverse speed is positioned between the main shaft 18 and a countershaft 20, and a secondary shaft 24 is disposed in parallel with the countershaft 20. The gear stages are equipped with hydraulic clutches C1–C4. The reference symbol CH in the drawing designates a hydraulic clutch for bypassing a one-way clutch 26. The output of the transmission is forwarded through a final gear 28 to a differential 30 from where it is transmitted to drive wheels 34 via drive shafts 32. The hydraulic clutch C4 is used in both forward and reverse operation. When a selector 36 is positioned on the left as seen in the drawing, the fourth forward gear is activated, and when it is positioned on the right, the reverse gear RVS is activated via an idle gear (not shown).

The opening of a throttle valve (not shown) located in the air intake passage (not shown) of the internal combustion engine 10 is detected by a throttle position sensor 40 and the road speed of the vehicle is detected from the speed of the countershaft 20 of the transmission 14 by a vehicle speed sensor 42 located in the vicinity of the countershaft 20. In addition., a brake switch 44 is provided near the brake pedal (not shown) for detecting whether or not the brakes are being applied and a range selector switch 46 is provided near a range selector (not shown) installed on the floor of the vehicle near the driver's seat for detecting which of seven ranges (P, R, N, D4, D3, 2 and 1) the driver has selected. An atmospheric pressure sensor 48 is provided at an appropriate location of the vehicle. The outputs of the throttle position sensor 40 etc. are sent to an ECU (electronic control unit) 50.

The ECU 50 is constituted as a microcomputer comprising a CPU (central processing unit) 50a, a ROM (read-only memory) 50b, a RAM (random access memory) 50c, an input circuit 50d and an output circuit 50e. The outputs of the aforesaid sensors and switches are input to the microcomputer through the input circuit 50d. As explained in detail later, the CPU 50a of the microcomputer decides the gear (ratio) (gear position) using a gear shift scheduling map selected in accordance with the road profile and outputs signals through the output circuit 50e for energizing/deenergizing solenoid valves 54, 56 of a hydraulic control circuit so as to operate shift valves (not shown) for engaging/disengaging the hydraulic clutch of the selected gear. (The solenoid valves 58, 60 shown in the drawing are for on/off control of a lock-up mechanism 16c of the torque convertor 16.)

The operation of the control system will now be explained with reference to the flow chart of FIG. 2. First, however, a brief explanation of the main features of the control system will be given with reference to FIG. 3.

In the control system, the predicted vehicle acceleration and the actual vehicle acceleration are determined to obtain a difference therebetween, and based on the difference one among five gear shift scheduling maps is selected to determine a gear (ratio) candidate to be shifted to is then determined by retrieving the map from a detected throttle opening and vehicle speed. At the same time, a fuzzy reasoning is conducted to correct the detected vehicle speed. Another map for level-road running is retrieved from the corrected vehicle speed and the actual throttle opening to determine a second gear (ratio) candidate to be shifted to. A desired gear (ratio) is finally determined from the first and second gear (ratio) candidates.

Figures 4, 5:
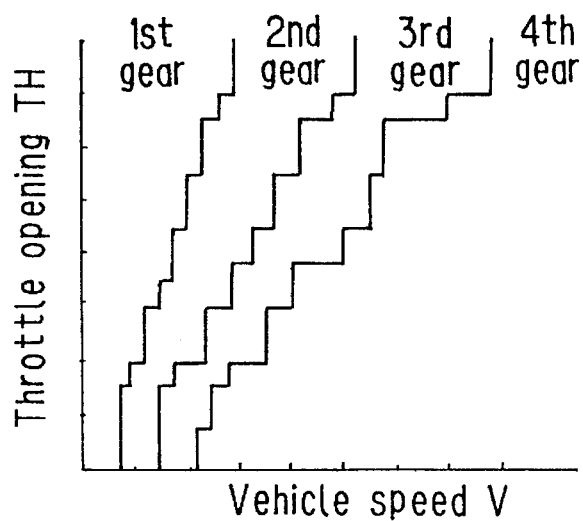
FIG. 4 is an explanatory view showing characteristics of a predicted acceleration of a vehicle to be used for gear shift scheduling map selection.
FIG. 5 is an explanatory view showing the characteristics of the gear shift scheduling map for level-road running.

As regards the gear shift scheduling map selection, the predicted acceleration of the vehicle (in third gear only) during level-road running is defined in advance as a function of the throttle opening and the engine speed. On the other hand, the actual acceleration of the vehicle calculated from the same parameters is multiplied by a coefficient for correcting it to a value corresponding to that in third gear. The predicted acceleration and the actual acceleration are compared with each other to obtain differences PNO, PKU, the average values of which are used for selecting (switching to) the appropriate gear shift scheduling map. The predicted acceleration is retrieved from a look-up table stored in the ROM 50b of the ECU 50 using the throttle opening and the vehicle speed as address data. Characteristics of such a table is shown in FIG. 4.

The reason for defining the predicted acceleration as a function of throttle opening and vehicle speed is that under identical driving conditions, specifically the same speed, gear and road profile conditions etc., the acceleration obtained varies with the motive power (i.e. with the engine load), while the driving resistance, especially the aerodynamic drag, varies with the vehicle speed. Five types of gear shift scheduling maps are prepared, one each for steep hill climbing, moderate hill climbing, level-road running, moderate hill descent and steep hill descent. FIG. 5 shows the characteristics of the map for level-road running and FIG. 6 those of the map for moderate hill climbing (in which it will be noted that the third-gear range is broader than that in the map for level-road running), While omitted from FIGS. 5 and 6 in the interest of simplification, as shown in FIG. 7, hysteresis is established in both the upshifting and downshifting directions of each map.

Figure 2:
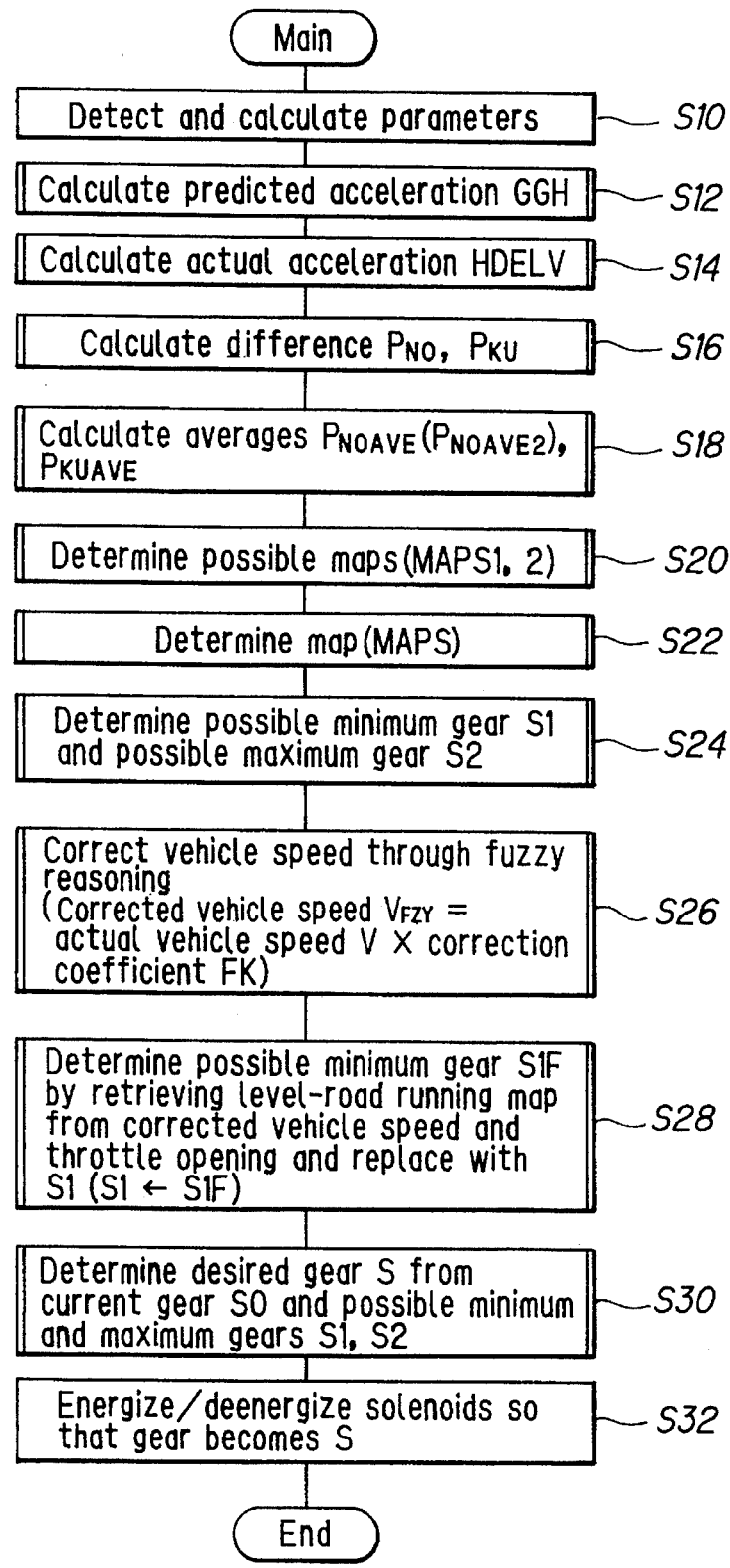
FIG. 2 is a main flow chart showing operation of the system shown in FIG. 1.
Figure 3:
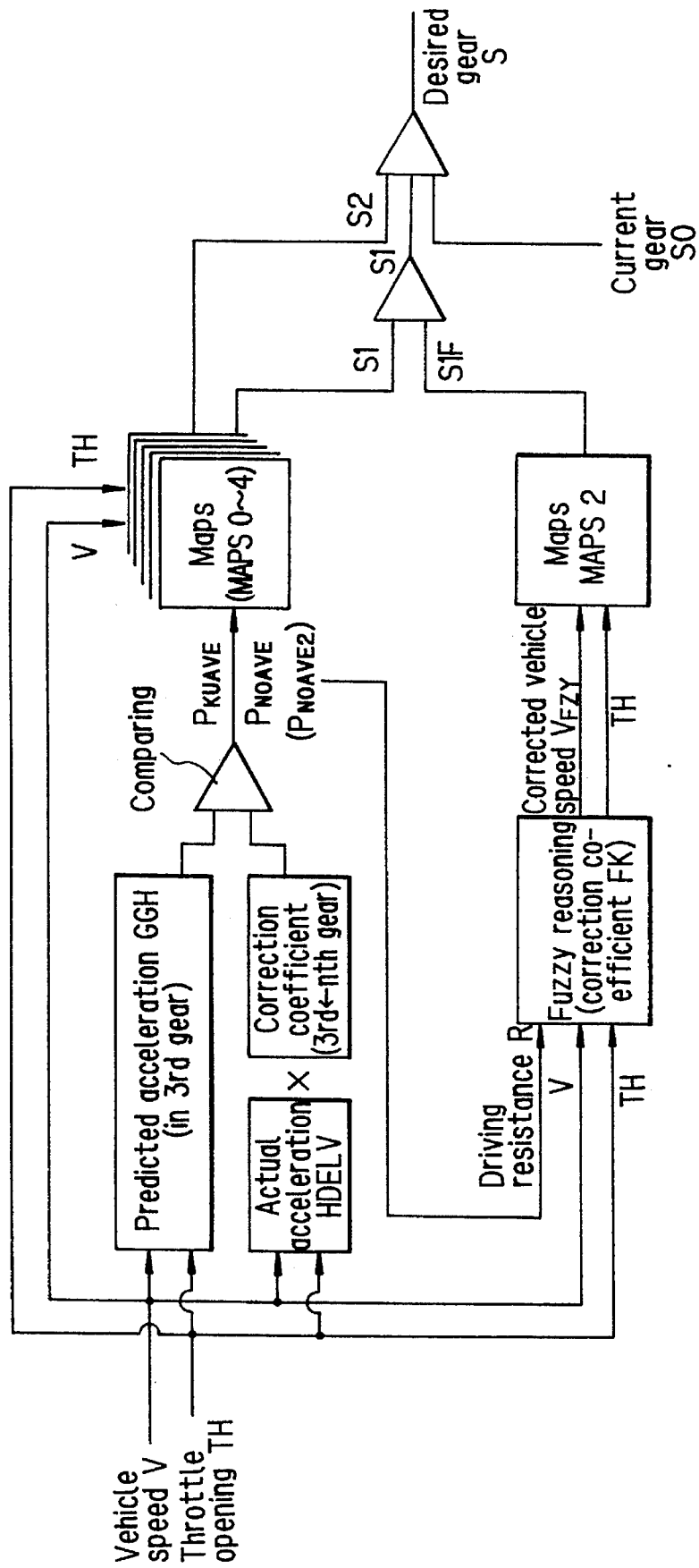
FIG. 3 is an explanatory view showing the main feature of the control system according to the invention including gear shift scheduling maps to be selected.

Returning to the flow chart of FIG. 2, the routine starts with step S10 in which the required parameters are obtained. The throttle opening and other such parameters are obtained as the sensor outputs themselves and the vehicle speed is calculated from the number of output pulses of the vehicle speed sensor 42 per prescribed period of time. However, as the change pattern of the throttle opening is also determined in this step, the processing for this will be explained with reference to FIG. 8. (The routine according to the flow chart of FIG. 2 is executed on a time interrupt basis once every 20 ms.)

Figure 8:
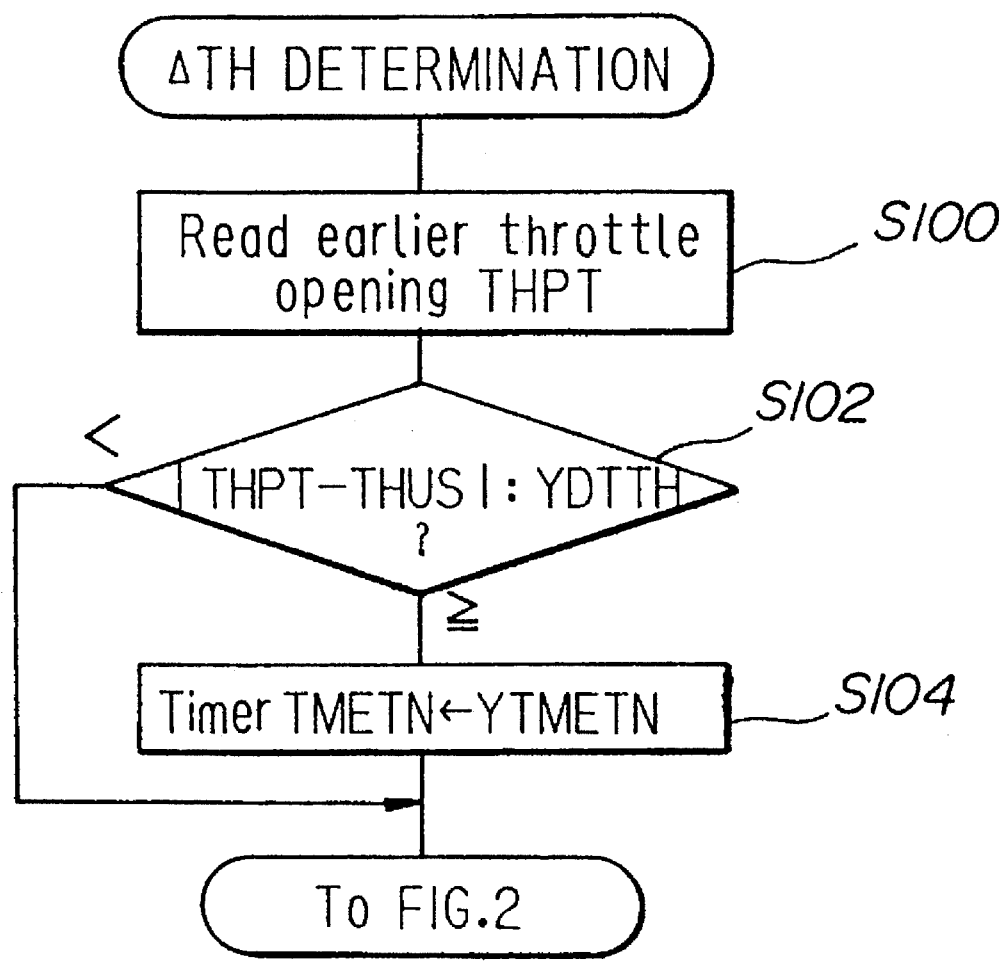
FIG. 8 is a flow chart of a subroutine of FIG. 2 flow chart showing the determination of the change of throttle opening.

In the routine according to the flow chart of FIG. 8, the throttle opening THPT detected a prescribed time earlier is first read, whereafter the program passes to step S102 in which the absolute value of the difference between the throttle opening THPT and the throttle opening THUS detected in the current cycle is calculated and compared with a prescribed throttle opening YDTTH (e.g. 0.5/8×WOT [°]). If the difference is larger than the prescribed value, i.e. if the change in throttle opening is found to be large, the program passes to step S104 in which a prescribed value YTMETN is set in a rapid throttle change timer (a down counter) TMETN and the passage of time is clocked. If the difference is found to be smaller than the prescribed value in step S102, the subroutine is immediately terminated.

Returning to the flow chart of FIG. 2, the predicted (vehicle) acceleration (designated as GGH) is calculated in the following step S12.

Figure 9:
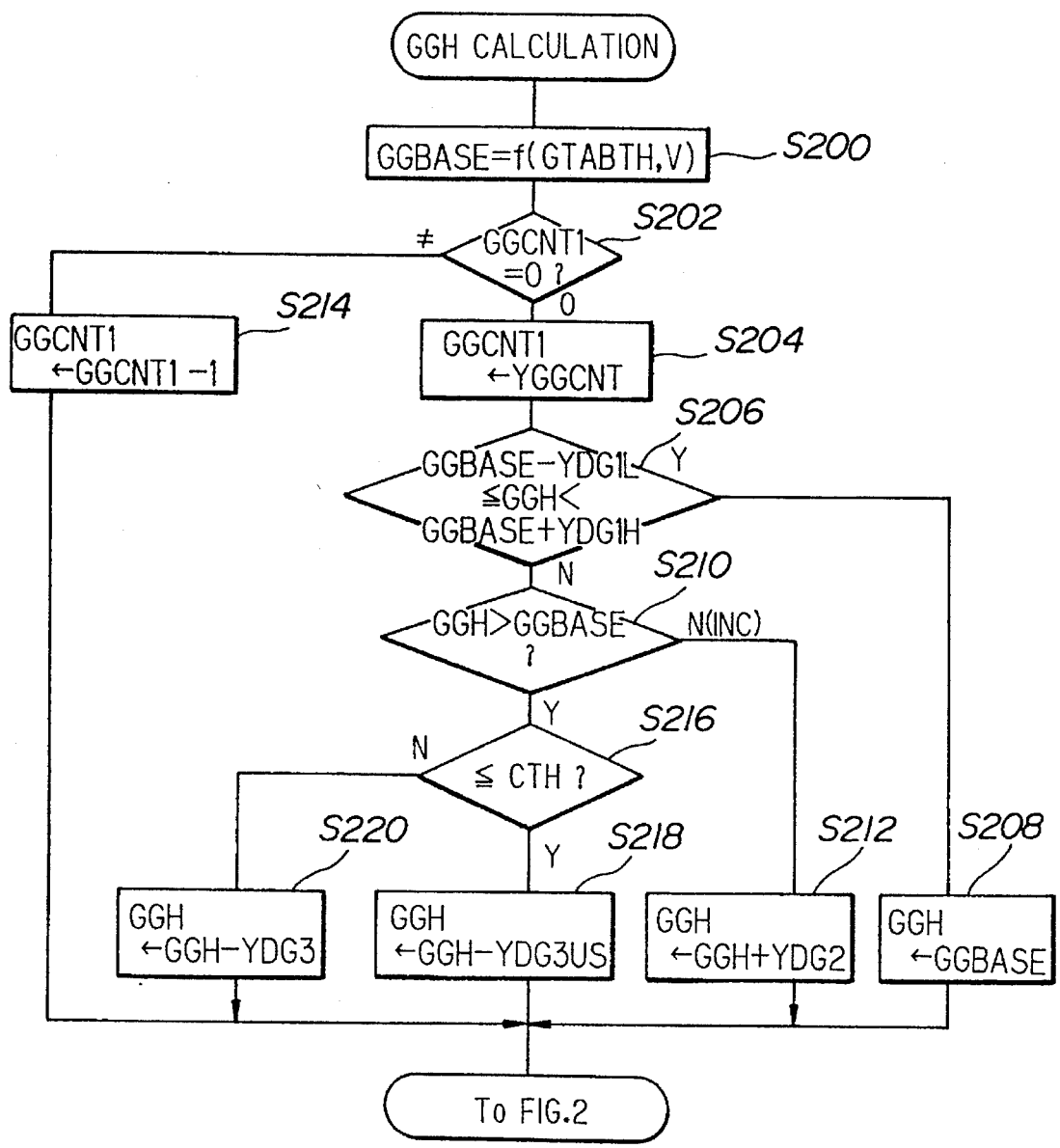
FIG. 9 is a flow chart of a subroutine of FIG. 2 flow chart showing the calculation of the predicted acceleration GGH.

A subroutine for carrying out this calculation is shown in FIG. 9. in the first step S200 of this subroutine, reference is made to the look-up table having the characteristics already shown in FIG. 4 and, using the throttle opening (the throttle opening used for table value retrieval being referred to as "GTABTH") and the current vehicle speed V as address data, a table-retrieved value GGBASE of the predicted acceleration is obtained. As explained earlier, this value represents the vehicle acceleration predicted to occur when the vehicle is running in third gear on a level road with such a throttle opening and at such a vehicle speed. It is expressed in m/s$^2$. The values appearing in FIG. 4 are only examples selected for easy understanding.

The program then passes to S202 in which a check is first made as to whether or not the value of a down counter GGCNT1 (to be explained later) is zero, and if it is, the counter is set to a prescribed value YGGCNT and started in step S204. This counter is for setting a smoothing interval during which the predicted acceleration is gradually increased (or decreased) when the change between the predicted acceleration values retrieved in the preceding and current cycles is large. More specifically, advancing to step S206, the value obtained by adding (or subtracting) a small value YDG1H (or YDG1L) to the value of GGBASE retrieved in the current cycle is compared with the value of GGH in the preceding cycle and a decision is made as to whether or not the change between the preceding and current cycles is within a prescribed range. If the change is found to be within the prescribed range in S206, since this means that the amount of change is small, the program passes to S208 in which the table-retrieved value (the value in the current cycle) GGBASE is used without modification as the predicted acceleration GGH.

Figure 10:
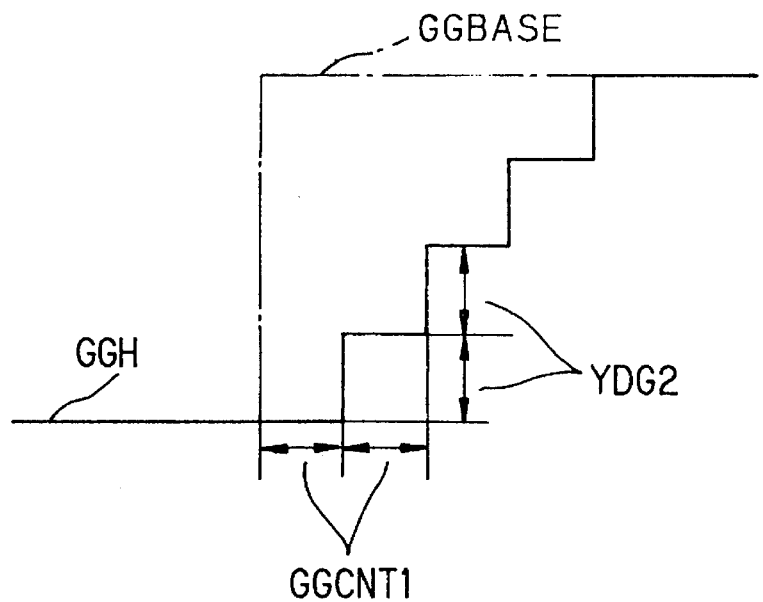
FIG. 10 is an explanatory view showing smoothing of the predicted acceleration calculated in the FIG. 9 flow chart when the change of the predicted acceleration is relatively large in the increase direction.

If step S206 finds that the change exceeds the prescribed range, the program passes to step S210 in which the predicted acceleration GGH in the preceding cycle is compared with the table-retrieved value GGBASE in the current cycle, and if the change is found to be in the increase direction, the program passes to step S212 where the value obtained by adding a prescribed unit amount YDG2 to the predicted acceleration GGH in the preceding cycle is used as the predicted acceleration GGH of the current cycle and the subroutine is terminated. Thereafter the counter value is decremented in step S214 in each subsequent execution of the subroutine and when it is found in step S202 that the counter value has reached zero, the counter is restarted in step S204 and control passes through step S206, step S210 to step S212, where another adjustment in the increase direction is conducted by adding the prescribed unit amount YDG2. In other words, as shown by the one-dot chain line in FIG. 10, when the change from the value in the preceding cycle is large, the steps gradually increase the value by incrementing it by a prescribed amount (YDG2) once every prescribed period of time (GGCNT1), until step S206 finds the change enters the prescribed range. This makes it possible to avoid abrupt changes in the predicted acceleration and thus to prevent the control hunting which would otherwise occur when the accelerator pedal is suddenly depressed.

Figure 11:
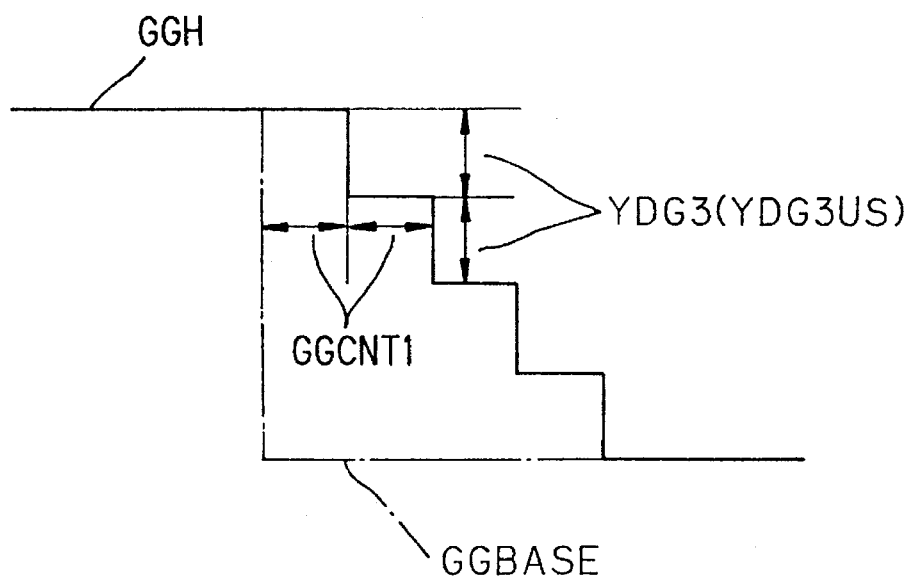
FIG. 11 is an explanatory view similar to FIG. 10, but shows smoothing of the predicted acceleration when the change of the predicted acceleration is relatively large in the decrease direction.

Similar circumstances also arise when it is found in step S210 that the predicted acceleration retrieved in the current cycle has decreased from the value in the preceding cycle. In this case, the program passes to step S216 in which it is determined whether or not the throttle opening is at or below an opening CTH in the vicinity of full-closed (the specific value of CTH being $(0.5/8) \times$ WOT [°]) and, depending on the result of the determination, the predicted acceleration GGH is gradually reduced so as to adjust it to the table-retrieved value in the current cycle by changing it either by a unit reduction amount YDG3US in step S218 or by a unit reduction amount YDG3 in step S220. The reason for using two different unit reduction amounts here is that the torque changes more quickly in response to changes in throttle opening when the throttle opening is at or below the vicinity of full-closed than it does in other cases. The relationship YDG3<YDG3US is therefore established. This stepwise adjustment in the reduction direction is shown in FIG. 11.

Returning to the flow chart of FIG. 2, the actual (vehicle) acceleration HDELV is calculated in step S14. The subroutine for this calculation is shown by the flow chart in FIG. 12. As was mentioned earlier, the predicted acceleration is the value for the case of driving in third gear and this makes it necessary to adjust the actual acceleration to a value corresponding to that in third gear. In the flow chart of FIG. 12, therefore, it is determined in steps S300 and S302 whether or not the current gear is second gear or below, third gear, or fourth gear and, depending on the result, a correction coefficient is determined in step S304, step S306 or step S308. Three separate correction coefficient look-up tables are prepared in advance, one for the first and second gears, one for third gear and one for fourth gear, each preestablishing ratio values addressed in accordance with the throttle opening and the vehicle speed, similarly to the case of the predicted acceleration look-up table shown in FIG. 4. Retrieval of the ratio values is conducted using the throttle opening GTABTH that was used for predicted acceleration retrieval and the vehicle speed V as address data (the table-retrieved correction coefficient is referred to as "GGFBASE").

No distinction is made between first gear and second gear in view of the fact that the fundamental purpose of the control is to improve gear-shift performance during hill climbing and hill descent and, specifically, is achieved by switching from the map for level-road driving to one for hill climbing or hill descent. Control according to a hill-climbing map causes a downshifting for increasing driving power, while that according to a hill-descent map cause a downshifting for increasing the braking effect of the engine. Since first gear is the lowest and no shifting down from this gear is possible, the same data is used for first gear as for second, because this simplifies the control. As regards the ratio table for third gear, moreover, since the predicted acceleration with which the actual acceleration adjusted using this ratio is compared is that for driving in third gear, the data for the ratio is set to 1.0.

Next, step S310 checks whether or not the value of a second down counter GGCNT2 is zero, and if it is, the program passes to step S312 in which the counter is set to the prescribed value YGGCNT and started, to step S314 in which the retrieved correction coefficient is compared with that in the preceding cycle to determine whether the difference with respect thereto falls outside a prescribed range and if it does, a smoothing operation similar to that conducted earlier in respect of the predicted acceleration is carried out. More specifically, in step S314 the value in the current cycle ±YDF1L,H is compared with that in the preceding cycle, and if it is within this range, the program passes to step S316 in which the table-retrieved correction coefficient GGFBASE is used without modification as the correction coefficient GGF.

When it is found in step S314 that the difference between the values in the current and preceding cycles is outside the aforesaid range, the program passes to step S318 in which the value of GGF in the preceding cycle and the value of GGFBASE in the current cycle are compared to determine whether the change is in the increase direction, and if it is, passes to step S320 in which a unit increase amount YDF2 is added to the value of GGF in the preceding cycle and the result is used as the correction coefficient in the current cycle, whereas if the change is in the decrease direction, the program passes to step S322 in which a unit reduction amount YDF3 is subtracted from the value of GGF in the preceding cycle and the result is used as the correction coefficient in the current cycle. In each subsequent execution of the subroutine, the counter value is decremented in step S324 until it is found in step S310 that the counter value has reached zero, at which time the increase (reduction) adjustment is repeated until it is found in step S314 that the adjusted value has come into the vicinity of that in the preceding cycle. As was explained regarding the predicted acceleration in connection with the flow chart of FIG. 9, the reason for using the aforesaid arrangement is to prevent abrupt changes in the control value.

Figure 13:
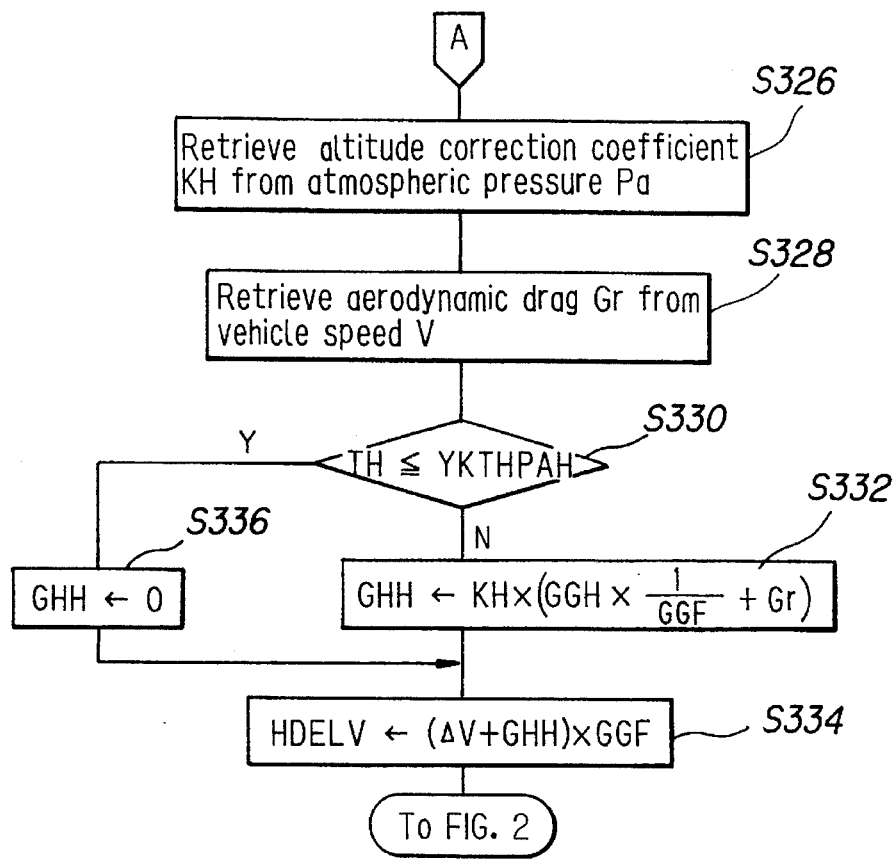
FIG. 13 is a second half of the flow chart of FIG. 12.
Figure 14:
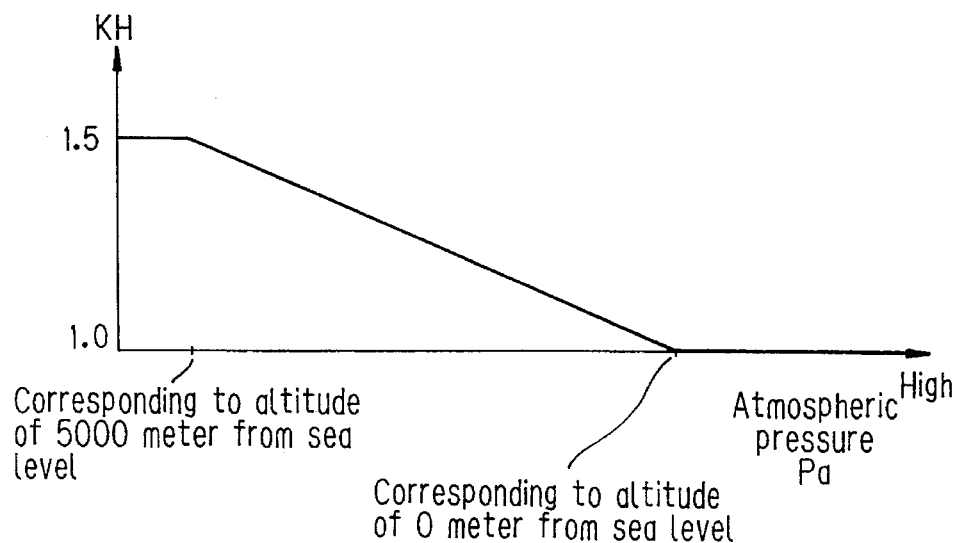
FIG. 14 is an explanatory view of the characteristics of an altitude correction coefficient KH to be used in the flow chart of FIG. 12(13)

The program then advances to step S326 in FIG. 13 flow chart in which a lookup table defined in advance is retrieved from the atmospheric pressure Pa detected through the atmospheric pressure sensor 48 to determine an altitude correction coefficient KH. FIG. 14 illustrates the characteristics of the table and as illustrated, the altitude correction coefficient KH is predetermined to decrease as the atmospheric pressure increases, i.e, as the altitude decreases. The program then advances to step S328 in which another table is looked up using the detected (current) vehicle speed V as address datum to determine the aerodynamic drag Gr. The driving resistance is generally calculated as rolling resistance+aerodynamic drag+climbing (grade) resistance. Since the aerodynamic drag in the driving resistance increases in proportion to the square of vehicle speed, the aerodynamic drag is predetermined with respect to vehicle speed and is prepared in advance as the table (whose characteristics are not shown) to be retrieved at this step.

The program then moves to step S330 in which the detected throttle opening TH is compared with a prescribed value YKTHPAH (a relatively small value such as $(1/8) \times$ WOT [°]). If it is found at step S330 that the detected throttle opening exceeds the prescribed value, the program goes to step S332 in which an acceleration correction coefficient GGH is calculated in the manner as is illustrated. That is the predicted acceleration GGH is multiplied by the reciprocal number of the correction coefficient GGF, is added by the aerodynamic drag Gr, and the sum is multiplied by the altitude correction coefficient KH to determine the acceleration correction coefficient GHH. The program then moves to step S334 in which a value delta V indicative of the detected vehicle speed change per unit time, i.e., the first difference of the vehicle speed [m/s$^2$] is calculated and is added to the predicted acceleration just corrected. The actual acceleration HDELV [m/s$^2$] is calculated by multiplying the sum by the correction coefficient GGF.

On the other hand, if step S330 finds that the detected throttle opening TH is not more than the prescribed value YKTHPAH, the program moves to step S336 in which the acceleration correction coefficient GHH is made zero. This is because, since the prescribed value YKTHPAH is set to be quite small, when the throttle opening is not less than the value, in other words, when the accelerator pedal is not depressed, it can be said that the vehicle is, at any rate, not hill climbing. And this is because, the vehicle acceleration is relatively small and the influence from the altitude will be negligible. In other words, it suffices if the correction is only conducted at a situation in which, notwithstanding that the accelerator pedal is depressed by an amount equal to or greater than the prescribed value, the engine output torque is not able to respond to the request due to the charging efficiency drop. In that sense, the acceleration coefficient GHH is added to the vehicle speed change delta V at step S334. To be more specific, the actual acceleration HDELV is calculated on the basis of the vehicle speed change delta V in principle and is multiplied by the coefficient to be a value corresponding to third gear. The vehicle speed change delta V is added to increase the actual acceleration so as to ensure that the acceleration deficiency at altitudes due to the engine output torque drop is compensated for.

It should be noted that the reason why the acceleration correction coefficient GHH is calculated based on the predicted acceleration GGH is, since the predicted acceleration GGH is defined in terms of engine output torque at a relatively low land based on throttle opening and vehicle speed as was explained in connection with FIG. 4, the predicted acceleration GGH is believed to be appropriate for determining the amount of compensation, i.e., for compensating for the engine output torque by the amount deficient than required by the driver due to the charging efficiency drop.

It is arranged such that the basic value of the predicted acceleration GGH is added by the aerodynamic drag Gr and the sum is then multiplied by the altitude correction coefficient KH. Since the altitude correction coefficient KH is determined to increase as the increasing aerodynamic drag and at the same time, is increased with the increasing altitude, the actual acceleration HDELV is corrected in the increasing direction as the altitude of a place where the vehicle is traveling increases.

Figure 12:
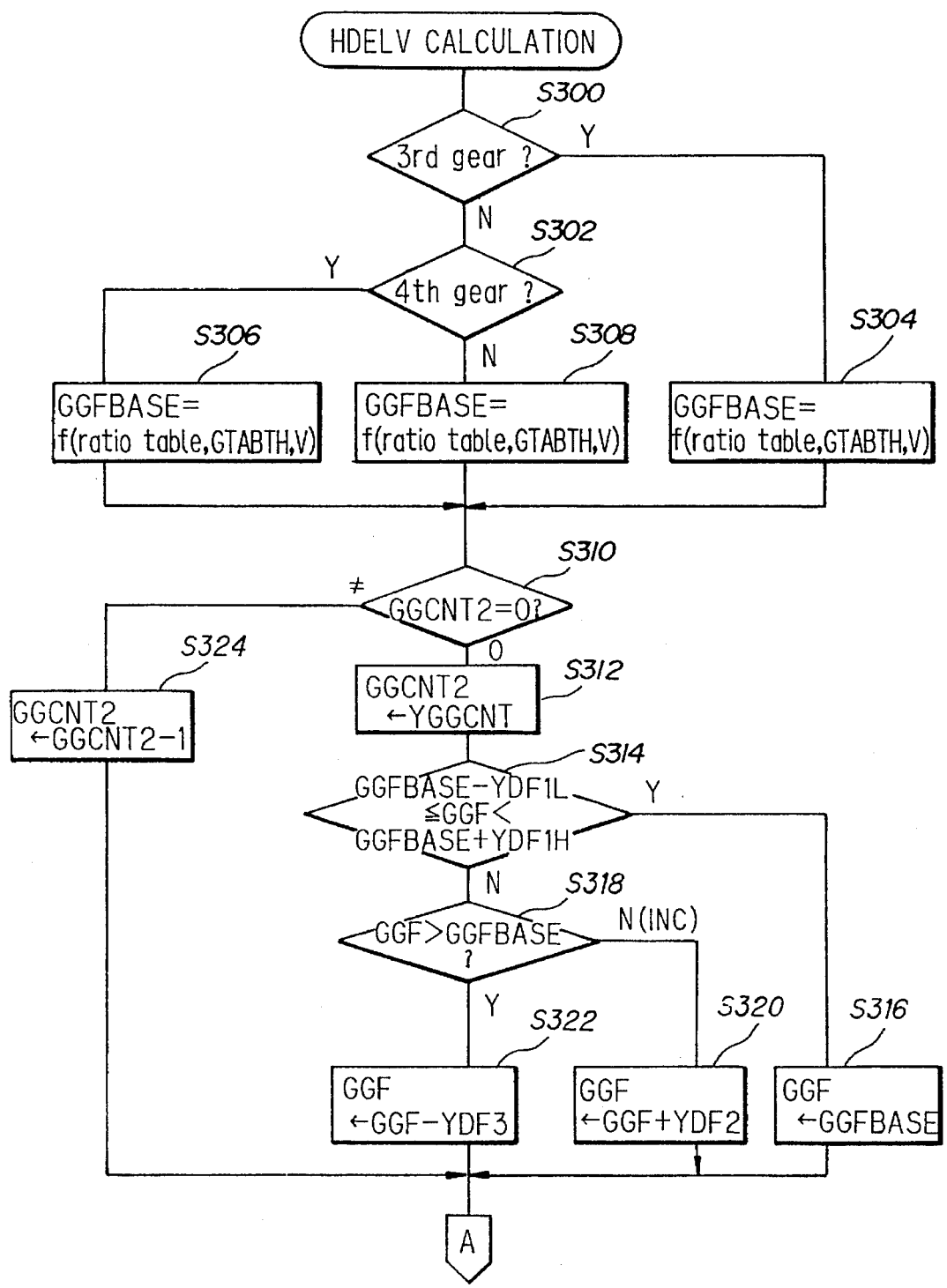
FIG. 12 is a first half of a flow chart of a subroutine of FIG. 2 flow chart showing the calculation of an actual acceleration HDELV of a vehicle.

Upon completion of the subroutine according to the flow chart of FIGS. 12 and 13, the program passes to step S16 of the flow chart of FIG. 2, in which the difference PNO or PKU between the predicted acceleration GGH and the actual acceleration HDELV is calculated. The subroutine for this calculation is shown by the flow chart in FIG. 15. PKU is the hill-descent direction difference obtained by subtracting the predicted acceleration GGH from the actual acceleration HDELV, while PNO is the hill-climbing direction difference obtained by subtracting the actual acceleration HDELV from the predicted acceleration GGH.

Figure 15:
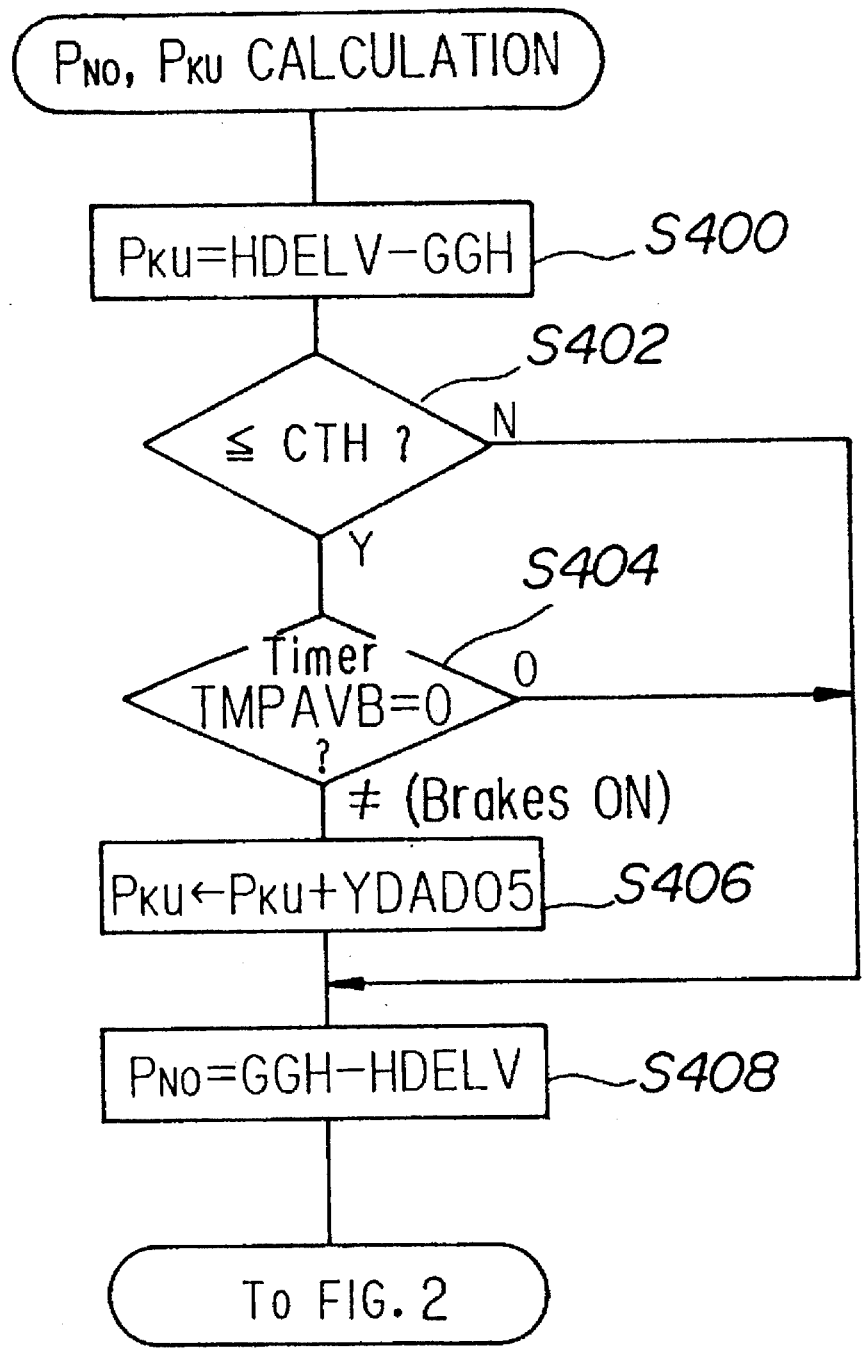
FIG. 15 is a flow chart of a subroutine of FIG. 2 flow chart showing the calculation of a difference PNO or PKU between the predicted acceleration and the actual acceleration.

The subroutine according to the flow chart of FIG. 15 starts with step S400 in which the difference PKU is obtained by the aforesaid method of calculation. The reason for reversing the subtraction order in calculating the differences is that during hill descent the actual acceleration becomes larger than the predicted acceleration (for level-road driving), while the opposite is the case during hill climbing. Moreover, the calculations of the differences for hill climbing and hill descent are made independently of whether or not the vehicle is actually traveling up or down hill. That is, the result obtained by subtracting the predicted acceleration from the actual acceleration is simply taken as the difference for hill descent and the reverse as the difference for hill climbing. This not only suffices but is advantageous. As will be explained in more detail later, the average value of the respective differences is used for map selection. If the vehicle is actually traveling downhill, only the difference PKU in the hill-descent direction will be positive, whereas if the vehicle is traveling uphill, the difference in the hill-climbing direction will be zero or less. By using only positive values for map selection it becomes possible to effectively determine the optimum gear ratio in response to changes in road slope without need for installing an inclination sensor.

The program then passes to step S402 which determines whether or not the throttle opening is at or below the opening CTH in the vicinity of full-closed, and if it is, next passes to step S404 which determines whether or not the value of a timer TMPAVB (down timer) has reached zero. This timer is set at the time the brakes are applied and starts when the brakes are released. Therefore, the determination here is for checking whether or not the brakes are being applied, more precisely whether or not a prescribed time has passed since the brake pedal was released after being once depressed. This is so that it will be determined that the brakes are being applied not only during depression of the brake pedal but also for a prescribed period (timer value) after its release, which is desirable because the braking system has a response delay and it takes a prescribed time for the braking force to reach zero after the depressed brake pedal is released. If step S404 finds that the brake timer value is not zero (braking in progress), the program passes to step S406 in which difference PKU is increased by adding a prescribed amount YDAD05 thereto. This is for compensating for the decrease in the actual acceleration caused by the braking force. The program then passes to step S408 in which the difference PNO is calculated by subtracting the actual acceleration HDELV from the predicted acceleration GGH.

Figure 16:
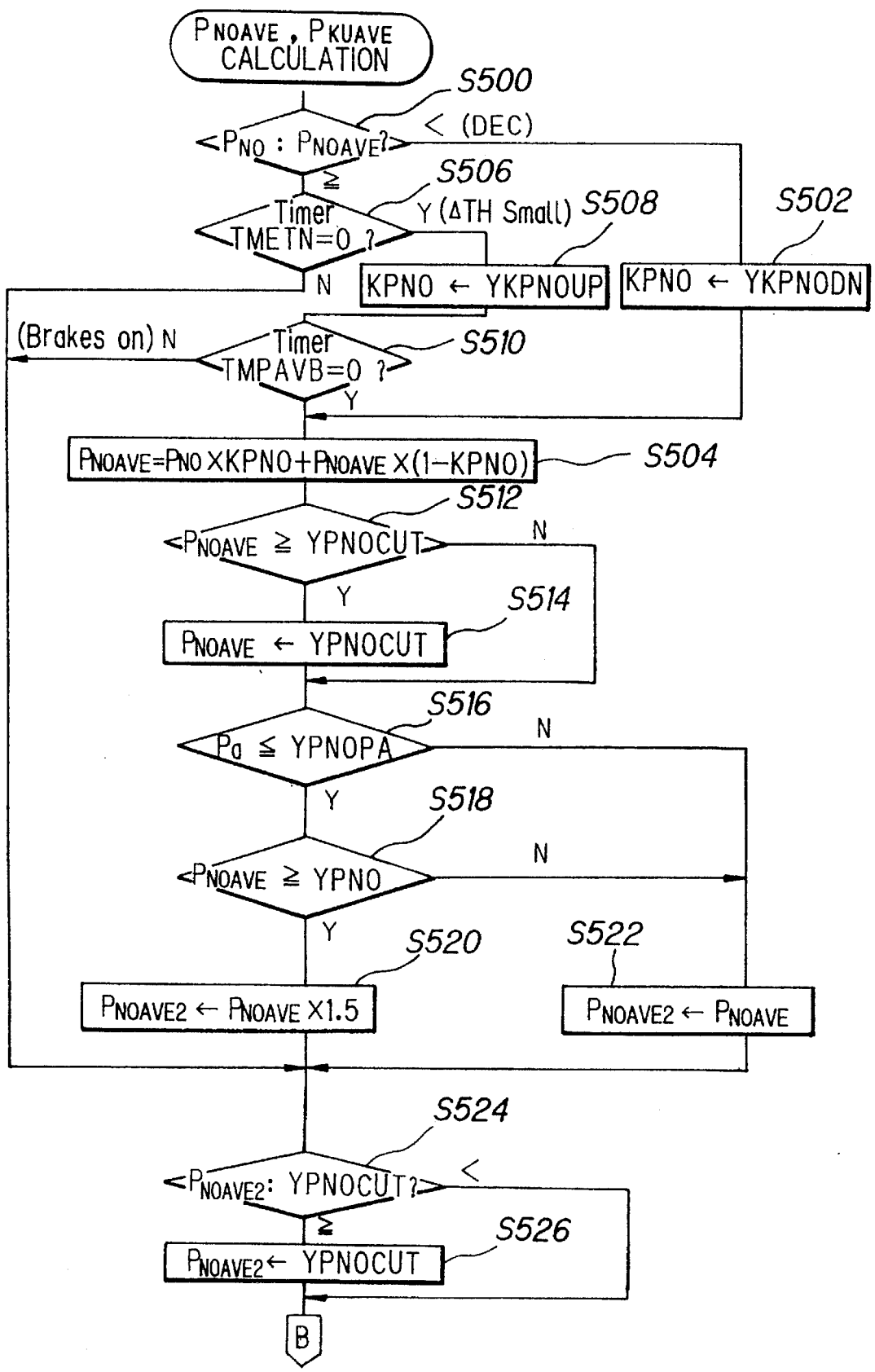
FIG. 16 is a first half of a subroutine of FIG. 2 flow chart showing the calculation of weighted average values PNOAVE or PKUAVE of the differences.
Figure 17:
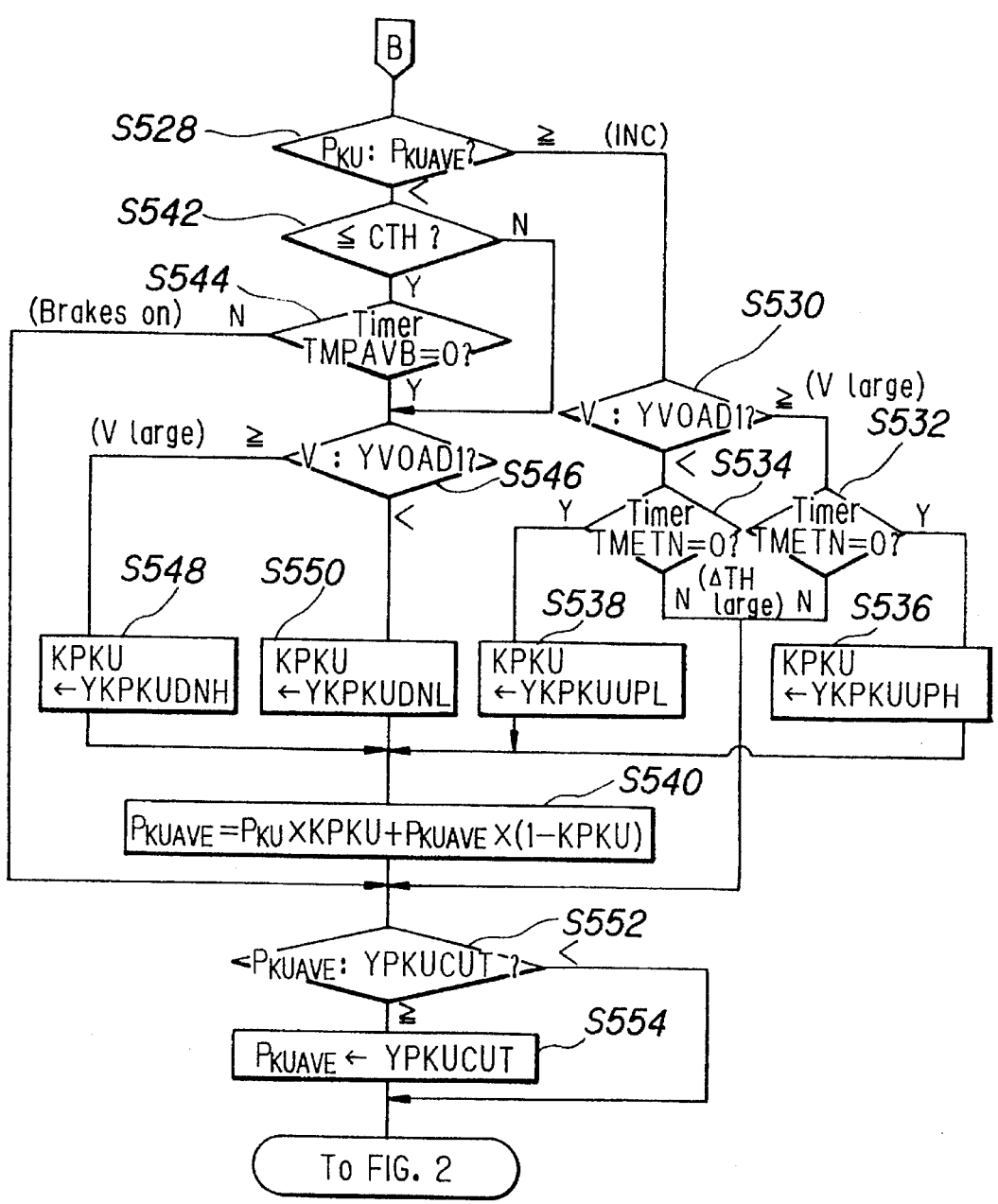
FIG. 17 is a second half of the flow chart of FIG. 16.

The program next passes to step S18 of the flow chart of FIG. 2 in which the average values (more specifically, the weighted average values) PNOAVE, PKUAVE of the differences PNO, PKU are calculated. The flow chart of a subroutine for carrying out this calculation is shown in FIGS. 16 and 17.

The subroutine starts from step S500 in which the hill-climbing direction difference PNO calculated in the current cycle is compared with the running average value (weighting coefficient) PNOAVE up to that time so as to determine whether the change relative to the value up to the preceding cycle is in the increase or decrease direction. If it is found to be in the decrease direction, the program passes to step S502 in which a smoothing coefficient KPNO is set to YKPNODN and then to step S504 in which the weighted average value is calculated using the equation shown. On the other hand, if it is found to be in the increase direction, the program passes to step S506 in which it is determined whether or not; the count value of the rapid throttle change timer TMETN referred to earlier in connection with FIG. 8 has reached zero, i.e. whether or not the throttle opening is changing rapidly. If it is not, the program passes to step S508 in which the smoothing coefficient is set to YKPNOUP, to step S510 in which it is confirmed that braking is not in progress, and then to step S504 in which the weighted average value is calculated.

Step S504 is skipped when step S506 finds that the throttle opening is changing rapidly. In this case, therefore, the average value PNOAVEn−1 calculated in the preceding cycle is used for deciding (holding) the map. As a result, it is possible to avoid making an error in the control value (map selection) during times when the throttle opening changes abruptly. The case where it is found in step S510 that the brakes are on is handled similarly. Since the apparent engine output torque is decreased by an amount corresponding to the braking force, which increases in proportion to the force with which the driver depresses the brake pedal, the engine does not produce an output torque corresponding to the table-retrieved throttle opening. Therefore, step S504 is skipped and the average value calculated in the preceding cycle is used.

Figure 18:
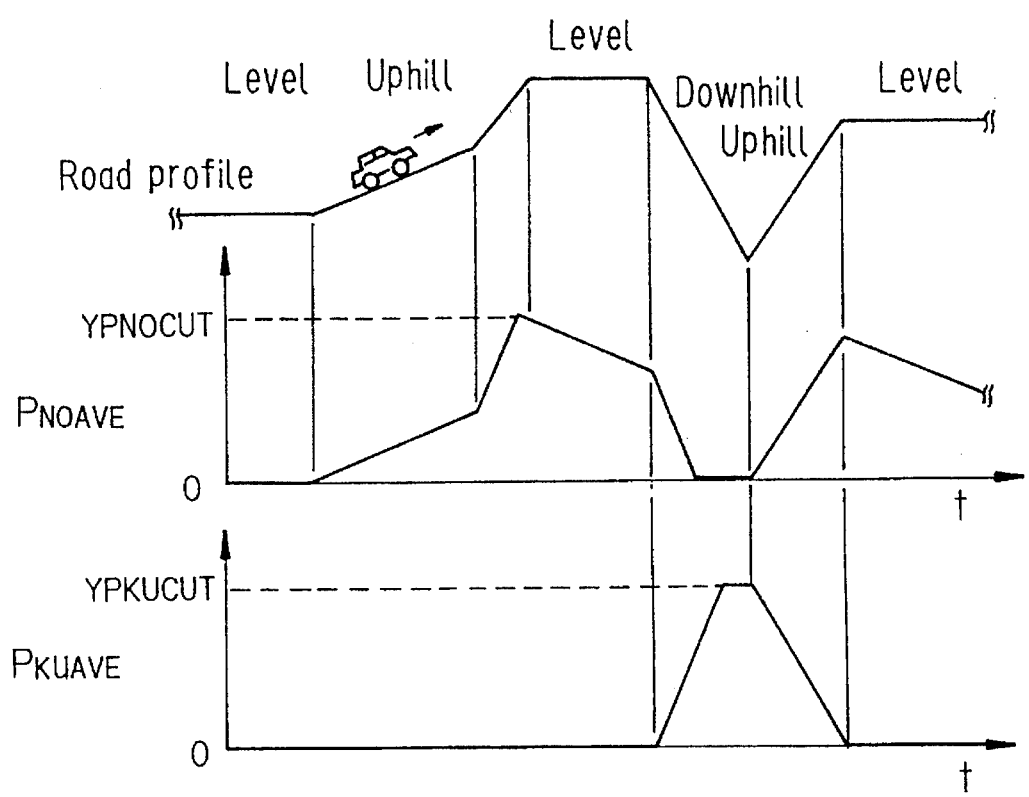
FIG. 18 is an explanatory view showing upper limit values used in FIG. 16(17) flow chart.

The program then passes to step S512 in which the calculated average value PNOAVE in the hill climbing direction is compared with an upper limit value YPNOCUT and if it is found to be larger, the average value is replaced with the limit value in step S514. In other words, when the vehicle finishes climbing the hill and reaches level ground again, the map has to be promptly changed to that for level-road driving, as shown in FIG. 18. This is the reason for establishing the upper limit value so as to make map switching smooth. When step S512 finds that calculated average value less than the upper limit value, step S514 is skipped.

The program next passes to step S516 in which the detected atmospheric pressure Pa is compared with a predetermined value YPNOPA. The predetermined value is the atmospheric pressure corresponding to a predetermined altitude such as 2000 meters above sea level. If it is found in the step that the detected value Pa is less than the predetermined value, since this indicates that vehicle is at or greater than the predetermined altitude, the program moves to step S518 in which the calculated average value PNOAVE is compared with a reference value YPNO to determine if the vehicle's hill climbing is at or above a certain degree. If it is, the vehicle is definitely hill climbing, the program passes to step S520 in which the calculated average value PNOAVE is multiplied by 1.5 and the product is renamed as "PNOAVE2". When the judgment at step S516 or S518 is negative, the program passes to step S522 in which the calculated value is immediately renamed as PNOAVE2.

The reason is as follows. As mentioned above, the altitude correction is conducted to compensate for the engine output torque drop at altitudes so as to ensure accurate estimation of hill climbing. The aforesaid disadvantage at altitudes due to the engine output torque drop, more specifically the tendency to fail in selecting an appropriate gear ratio at altitudes so that the driver feels busy in repeated gear shifting will increase with the increasing altitude. For that reason, it will be preferable to switch a map to that for moderate hill climbing or steep hill climbing in which the lower gear region is set to be broader such that gear is shifted to lower one at an earlier stage and hence the tendency of the driver to feel busy is decreased. That is, as will be explained later in detail, each time the average value PNOAVE indicates of the degree of hill climbing exceeds reference values, the map will successively be switched from that for level-road running to that for moderate hill climbing, to that for steep hill climbing. In the embodiment, when the vehicle is hill climbing at a place whose altitude is at or greater than a predetermined altitude, switching to the hill climbing map occur at a time earlier than it does at a low land. With the arrangement, the map switching at altitudes will occur immediately at high lands, whereby reducing the tendency to make the driver to feel busy and hence enhancing drivability.

The program next passes to step S524 in which the renamed averaged value PNOAVE2 is again compared with the upper limit value YPNOCUT and if the value PNOAVE2 is found to exceed the limit value YPNOCUT, the value is replaced with the limit value at step S526.

Next, the hill-descent direction difference value is calculated starting from step S528 in which the value PKU calculated in the current cycle is compared with the average value PKUAVE up to the preceding cycle. When it is found to be changing in the increase direction, since this means that the vehicle continues to travel downhill, the program passes to step S530 in which the vehicle speed V is compared with a prescribed vehicle speed YVOAD1, to step S532 or step S534 in which it is confirmed that the throttle opening is not changing rapidly, and then, depending on the result of the comparison, to step S536 or step S538 in which a smoothing coefficient (weighting coefficient) KPKU is selected, and thereafter to step S540 in which the weighted average value PKUAVE is calculated. The reason for changing the coefficient according to the vehicle speed is to provide an early opportunity for downshifting in view of the vehicle speed during hill descent, which is desirable because the driving resistance is not so large during hill descent. Therefore, the relationship YKPKUUPH>YKPKUUPL is established between the coefficients so that the coefficient becomes larger with increasing vehicle speed, whereby the value in the current cycle is strongly reflected in the average value. For the same reason as was explained with respect to PNO, step S540 is skipped and the average value in the preceding cycle used when steps S532 and S534 determine that the throttle opening is changing rapidly.

When it is determined in step S528 that value in the current cycle has decreased from the running average value up to the preceding cycle, this is taken to mean that the downhill slope is coming to an end and, therefore, the program passes to step S542 in which it is confirmed that the throttle is at or below the vicinity of full-closed and to step S544 in which it is confirmed that braking is not in progress, thereafter to step S546, similarly to what was explained above, one of the smoothing coefficients is selected in response to the vehicle speed and the average value is calculated (steps S548, S550, S540). Here again, as in the case as change in the increase direction, the coefficient is set to be larger toward the high vehicle speed side. Next, from step S552 onward, it is determined whether or not the calculated value is greater than the upper limit value, and if it is, is limited to the upper limit value in step S554. As shown in FIG. 18, this is for compensating for detection delay at the time of returning to level ground, similarly to the case of hill climbing explained earlier. If step S544 finds that braking is in progress, it becomes difficult to obtain an accurate value for the same reason as explained with respect to step S510 and, therefore, the program is passed directly to steps S552 and S554 for using the average value up to the preceding cycle.

Figure 19:
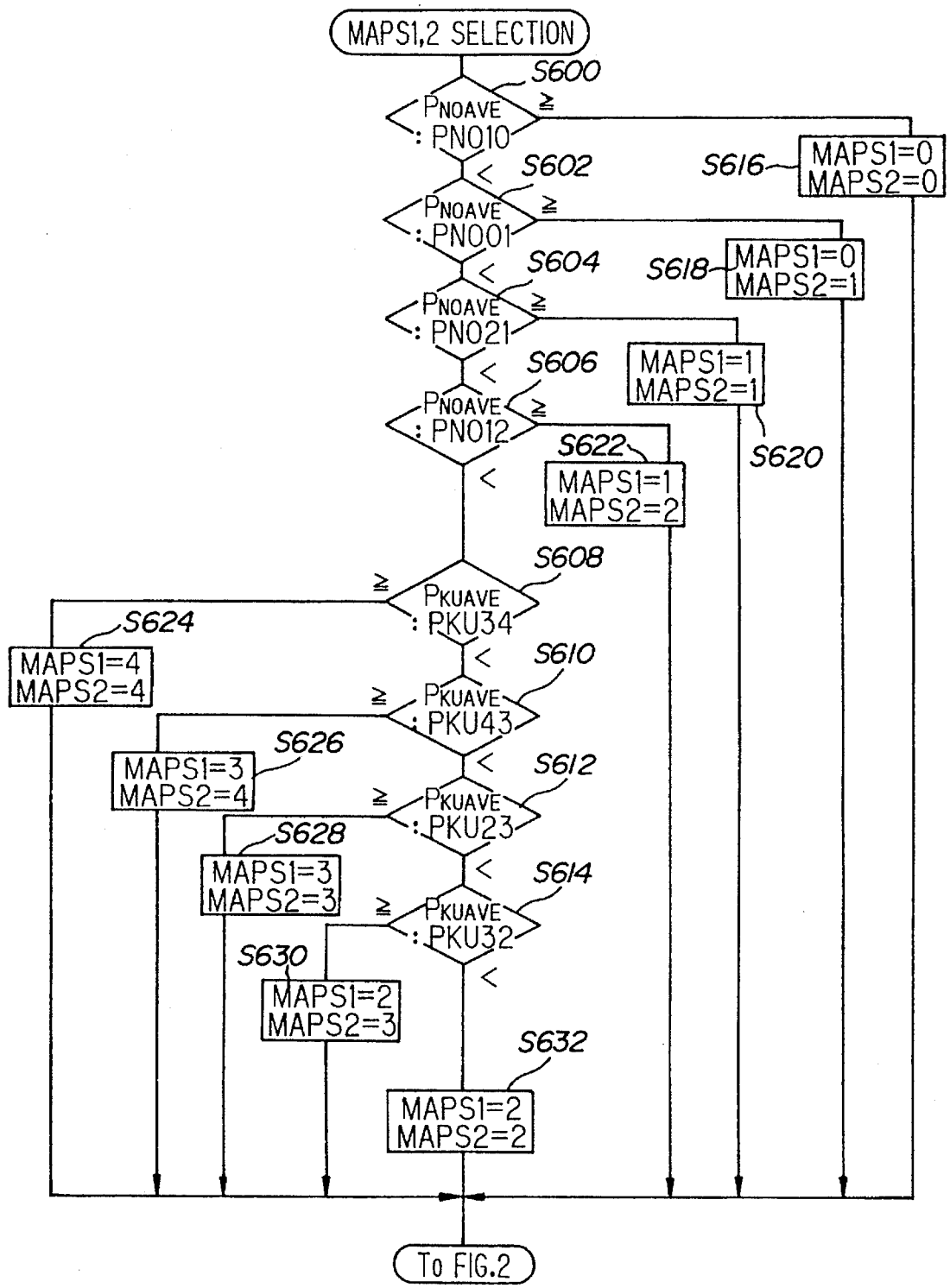
FIG. 19 is a flow chart of a subroutine of FIG. 2 flow chart showing the selection of possible maximum and minimum maps MAPS1,2 based on the weighted average values.

Returning to the flow chart of FIG. 2, the program next passes to step S20 in which selection of possible maximum and minimum maps MAPS1,2 is conducted. As mentioned before, five types of shift maps corresponding to five degrees of slope are assigned the numbers 0, 1, 2, 3 and 4 and the maximum value and minimum value (map number) that can be adopted in view of the average difference value at that time are set as MAPS 1, 2. FIG. 19 shows the flow chart of a subroutine for carrying out this selection. In steps S600–S606 the hill-climbing direction average value PNOAVE is compared with each of map reference values PNOmn and, following this, in steps S608–S614 the hill-descent direction average value PKUAVE is compared with each of map reference values PKUmn. As a result, one of steps S616– S632 is selected and the minimum value that can be adopted (MAPS1) and the maximum value that can be adopted (MAPS2) are decided. FIG. 20 shows map reference values established in correspondence with average difference values.

As stated above, in the control according to this embodiment of the invention, five types of maps are prepared and assigned numbers as follows:

0: steep hill climbing
1: moderate hill climbing
2: level-road running
3: moderate hill descent
4: steep hill descent As shown in FIG. 20, hysteresis regions are established between adjacent maps and when the average difference value falls in one of these regions the map on either side can be adopted. In the control, the maximum value and minimum value (as regards map number) is first decided. The result of the selection by the flow chart of FIG. 19 can be summarized as shown in FIG. 21.

Then, returning to the flow chart of FIG. 2, in the succeeding step S22 one map is decided on between the two types of selected maps.

Figure 22:
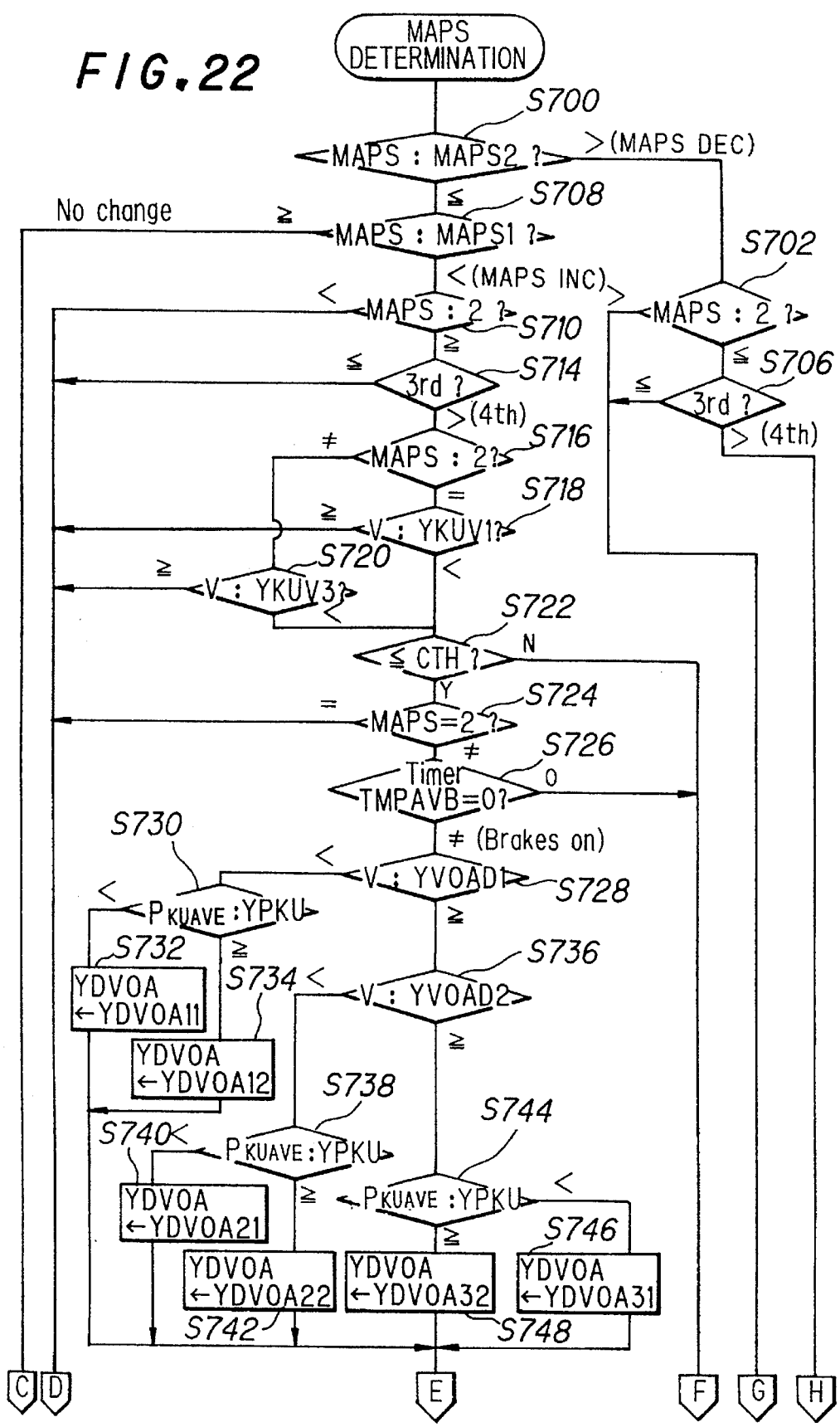
FIG. 22 is a first half of a flow chart of a subroutine of FIG. 2 flow chart showing the decision of one map MAPS on between the selected maps.
Figure 23:
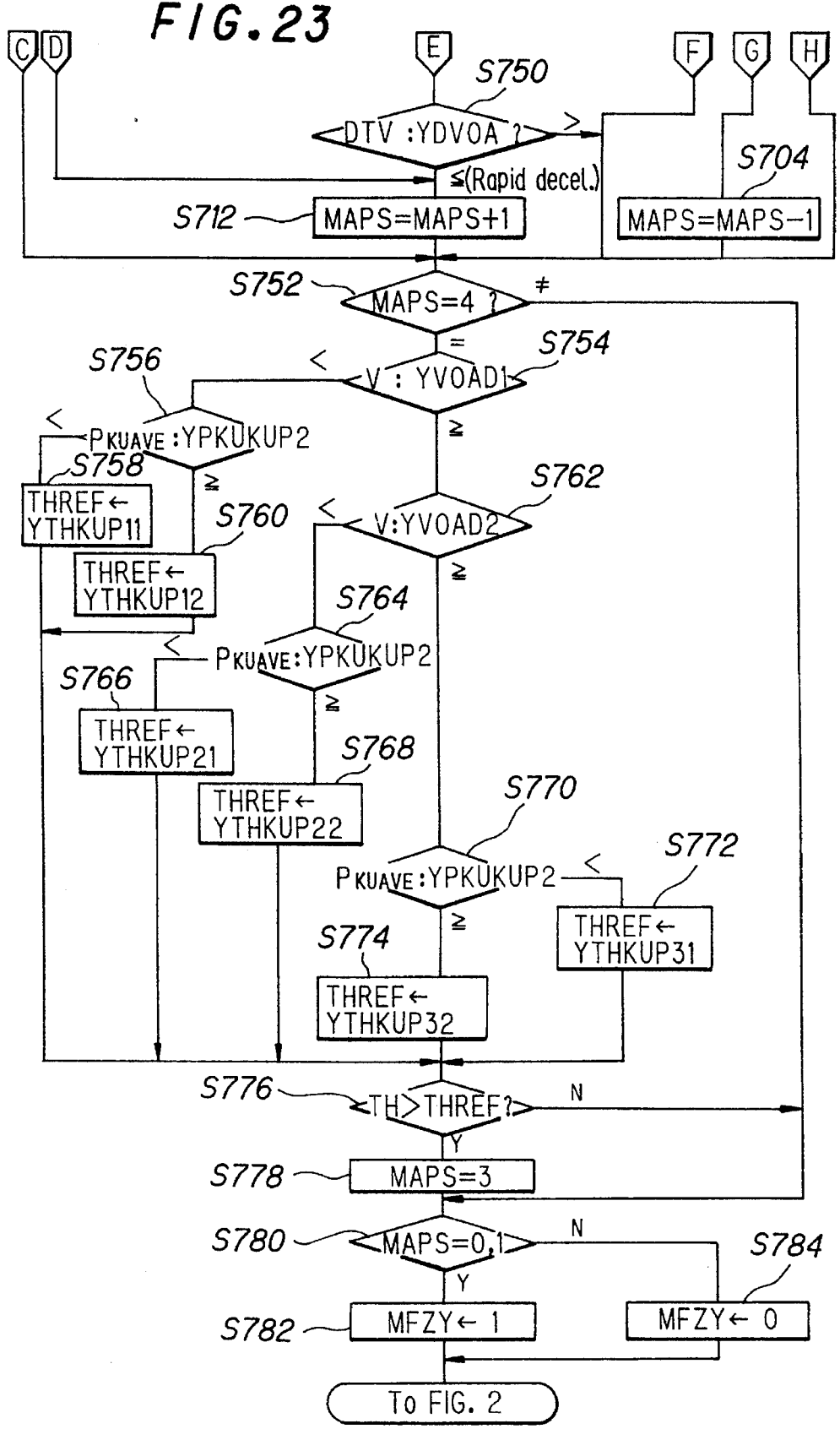
FIG. 23 is a second half of the flow chart of FIG. 22.

The flow chart of a subroutine for carrying out this decision is shown in FIGS. 22 and 23. First, in step S700, the currently selected map (referred to as "MAPS") and MAPS2 (the maximum map) are compared. More specifically, since, logically, it suffices to decide the map to be selected so that maximum map ≧ selected map ≧ minimum map, it is first determined whether or not the current map exceeds the maximum map, and if it does, the selected map is changed to the maximum map or a lower one.

Therefore, when step S700 finds that the current map exceeds the maximum map, the number of the current map has to be greater than 0, meaning that it is one of map numbers 1, 2, 3 and 4, and the program thus passes to step S702 which determines whether or not its number is 2 (level-road running map). If it is higher or greater than 2, the possibilities become map numbers 3 and 4, and since these are maps for hill descent, the map number obtained by subtracting 1 from the current map number is decided on in step S704. For example, if the map for steep hill descent is currently being used, a switch is made to the map for moderate hill descent. When step S702 finds that the current map is the one for level-road running or a lower one, the possibilities become 2 and 1, and a switch is made from the map for level-road running to the map for moderate hill climbing or from the map for moderate hill climbing to the map for steep hill climbing.

Figure 6:
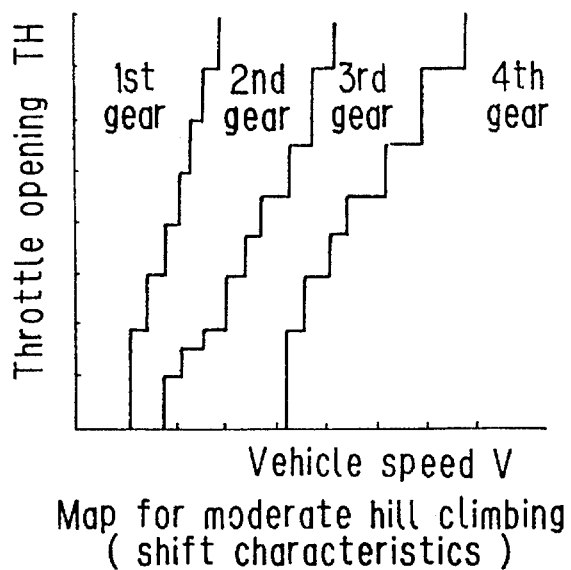
FIG. 6 is an explanatory view showing the characteristics of another gear shift scheduling map for moderate hill climbing.
Figure 7:
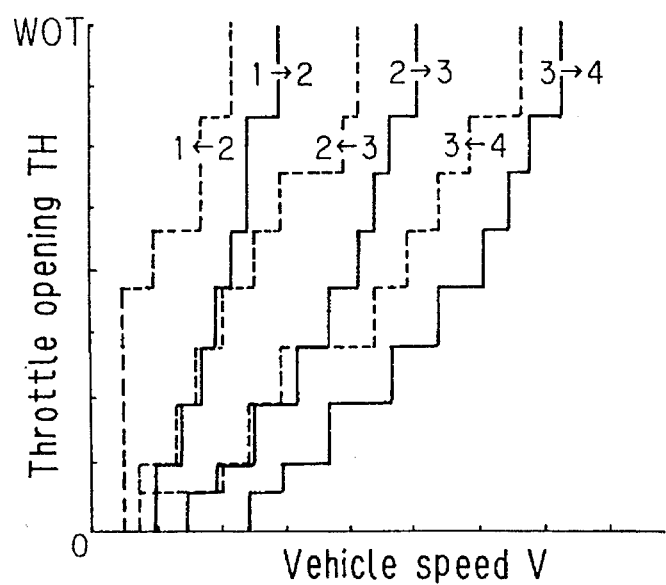
FIG. 7 is an explanatory view showing hysteresis for upshifting and downshifting in the maps.

As was indicated earlier in connection with FIGS. 5 and 6, in the maps used in the present control the third-gear range is broader in the map for moderate hill climbing than in the map for level-road running and is broader in the map for steep hill climbing than in the map for moderate hill climbing. The same also applies on the hill-descent side, namely the breadth of the third-gear range, increases in order from the map for level-road running to the map for moderate hill descent to the map for steep hill descent. This relationship is established for increasing driving power during hill climbing and increasing the engine braking effect during hill descent. However, it leads to the possibility that when the vehicle is being driven in fourth gear a switch in maps will cause an immediate shift down to third gear, which is not likely to be what the driver expects and is thus undesirable. For avoiding this, a determination is made in step S706 as to whether or not the current gear is third gear, and only in the case where it is found to be third or a lower gear, is a switch made from the map for level-road running to the map for moderate hill climbing or from the map for moderate hill climbing to the map for steep hill climbing. Thus map switching is suspended during driving in fourth gear.

When step S700 finds that the current map is the maximum map or a lower one, since this means that the upper limit condition is met, a determination is next made regarding the lower limit condition. Specifically, step S708 determines whether or not the current map (number) is at or greater than MAPS1 (minimum map (number)), and if it is found to be the minimum map or a higher one, this means that the aforesaid logical relationship is met and the map is not changed.

If step S708 finds that the current map (number) is lower than the minimum map, it become necessary to switch to a value not lower than that of the minimum map. The program therefore passes to step S710 in which the current map is compared with the map for level-road running. If the current map is found to be lower than the map for level-road running, this means that the map that should be selected is either 1 or 2, and therefore, the program passes to step S712 in which 1 is added to the number of the current map. Thus if the map for moderate hill climbing is currently in use, it is switched to the map for level-road running, and if the map for steep hill climbing is currently in use, it is switched to the map for moderate hill climbing. If step S710 finds that the current map is the map for level-road running or a higher or greater one, since this means that the current map number is 2 or 3 (since step S708 found the current map number to be smaller than that of the minimum map, the number of the current map cannot be 4 even if the minimum map is assumed to have the maximum value of 4). Since increasing from 2 or 3 leads to a problem regarding the broadening of the third-gear range, the program passes to step S714 in which a determination is made as to whether or not the current gear is third or lower, and if it is, since this means that no unexpected downshifting will occur, the program passes to step S712 in which map switching is carried out immediately. On the other hand, if the current gear is found to be fourth gear, the program passes to step S716 in which the current map (number) is compared with the level-road running map (number).

Figure 24:
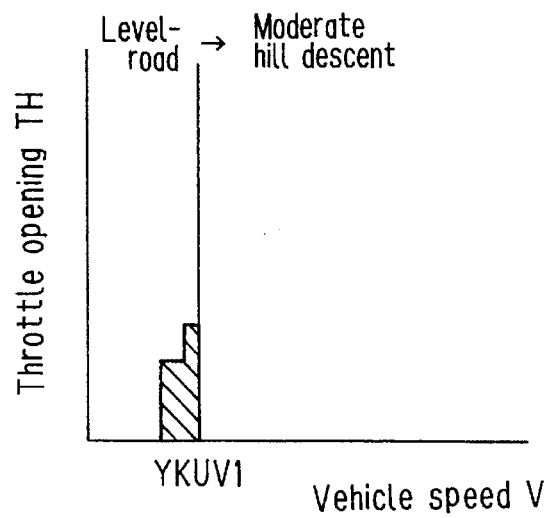
FIG. 24 is an explanatory view showing a boundary vehicle speed between the map for level-road running and the map for moderate hill descent.

If step S716 determines that the current map (number) is the level-road running map (number), the program passes to step S718 in which the vehicle speed is compared with a prescribed value YKUV1, and if it determines that the current map (number) is not the level-road running map (number), i.e if it determines that the current map (number) is the moderate hill climbing map (number), the program passes to step S720 in which the vehicle speed is compared with another prescribed value YKUV3. If the vehicle speed is found to be equal to or greater than the prescribed value in either of steps S718 or S720, the program skips to step S712 and map switching is carried out. This will be better understood from FIG. 24. As was explained earlier, the breadth of the third gear range is greater in the maps for hill climbing and descent than in the map for level-road running. As shown specifically in FIG. 24, the boundary vehicle speed for shifting from third gear to fourth gear when the map is changed from that for level-road running to that for moderate hill descent is set as vehicle speed YKUV1. Since there is therefore no possibility of a shift-down when the vehicle speed is equal to or higher than the boundary speed, the program is passed to step S712 for switching maps. On the other hand, if the vehicle speed is found to be below the boundary level, the possibility of a downshifting exists and, therefore, a determination is carried out in the following steps as to whether or not one will. While FIG. 24 relates only to the case of switching from the level-road running map (#2) to the moderate hill descent map (#3), switching from the moderate hill descent map (#3) to the steep hill descent map (#4) is handled in a similar manner.

When it is found in step S718 or step S720 that the current or actual vehicle speed is below the boundary level, the program passes to step S722 in which it is determined whether or not the throttle is at or below the vicinity of full-closed. If the result is negative, since this means that the accelerator pedal is being depressed and the accelerator pedal is being depressed at fourth gear, a shock could arise if gear is shifted down. This will be a special driving condition and at any rate this does not imply that the driver intends to shift down to use engine braking, controls skips step S712 to avoid map changing.

On the other hand, step S722 founds that the throttle is at or below the vicinity of full-closed, since this means that the accelerator pedal is not being depressed and implies that the driver wants to reduce the vehicle speed, the program passes to step S724 in which another check is made as to whether or not the current map is that for level-road running, and if it is, skips to step S712 in which the map is changed, and if it is not, since this means that the current map is that for moderate hill descent, passes to step S726 where a determination is made as to whether the brakes are being applied, so as to discern whether the driver actually wants to decelerate. If the brakes are not being applied, since this can be taken to mean that it is not the driver's intention to slow down, step S712 is skipped and the map is not changed.

If it is found that the brakes are being applied, the program passes through steps S728 to S748 for selecting a degree of deceleration data YDVOAmn (explained later), and then to step S750 in which the selected degree of deceleration data YDVOAmn is compared with an actual degree of deceleration data DTV, a value determined through deceleration of vehicle speed per unit time during braking and is assumed to indicate the driver's intention to decelerate the vehicle speed, and map switching is conducted if needed. More specifically, the program passes to step S728 in which the detected current (actual) vehicle speed V is compared with the aforesaid value YVOAD1. If step S728 finds that the current vehicle speed V is less than the value YVOAD1, the program moves to step S730 in which the average value PKUAVE in the descent direction is compared with a prescribed value YPKU and in response to the comparison result, to step S732 or S734 in which either of the degree of deceleration data YDVOA11 and YDVOA12 is selected. If it is determined at step S728 that the current vehicle speed is not less than the predetermined vehicle speed YVOAD1, the program passes to step S736 in which the current vehicle speed V is compared with a second predetermined value YVOAD2.

If step S736 finds that the detected current vehicle speed V is less than the second predetermined value, the program passes to step S738 in which the average value PKUAVE in the hill descent direction is compared with the aforesaid predetermined value and on the basis of the comparison result, the program passes to step S740 or S742 in which a degree of deceleration data YDVOA21 or YDVOA22 is selected. On the other hand, if the detected current vehicle speed V is found to be not less than the second predetermined value YVOAD2, the program passes to step S744 in which the average value PKUAVE in the hill descent direction is compared with the predetermined value YPKU and in response to the result of the comparison, a degree of deceleration data YDVOA31 or YDVOA32 is selected at step S746 or S748. The program next passes to step S750 in which the selected degree of deceleration data YDVOAmn is compared with the actual degree of deceleration data (deceleration of vehicle speed per unit time during braking). When the actual degree of deceleration data DTV is found to be not more than the selected degree of deceleration data, i.e., when the actual degree of deceleration data (e.g. −50 km/h) is found to exceed the selected degree of deceleration data (e.g. −30 km/h) in the minus direction, it is determined that rapid deceleration is in progress and the program passes to step S712 for changing the map.

This is conducted notwithstanding that the driver has applied the brakes and wants to slow down and is for preventing map switching and thus avoiding an abrupt engine braking effect (owing to downshifting) which would otherwise occur at an intensity that increases in proportion to the vehicle speed at the time of the shift-down. Therefore, it is arranged such that more degree of actual deceleration data is required for map switching as the vehicle speed becomes higher. Thus, the map is changed to enable downshifting only when it is determined from the result of the comparison that rapid deceleration is intended. In other words, the braking operation indicates that the driver wants to slow down. At that condition, if the braking suffices the driver's intended deceleration, to conduct shift-down to make the vehicle to further slow down will not meet the driver's intention and hence is avoided. Moreover, downshifting makes the vehicle to travel at a lower gear (i.e., run at a greater gear ratio) than usual and as a result engine speed rises so that the engine becomes noisier. In particular, with the increasing steepness of the downhill vehicle speed rises and engine speed tends to rise. The degree of deceleration data is therefore predetermined taking the vehicle speed and road profile (grade) into account in such a manner that the degree of deceleration data grows with increasing downhill grade and/or with increasing vehicle speed so that the addition of MAPS at step S712 is hard to occur, i.e., switching to the maps for hill descent having the broader low gear region is not likely to occur.

Figure 25:
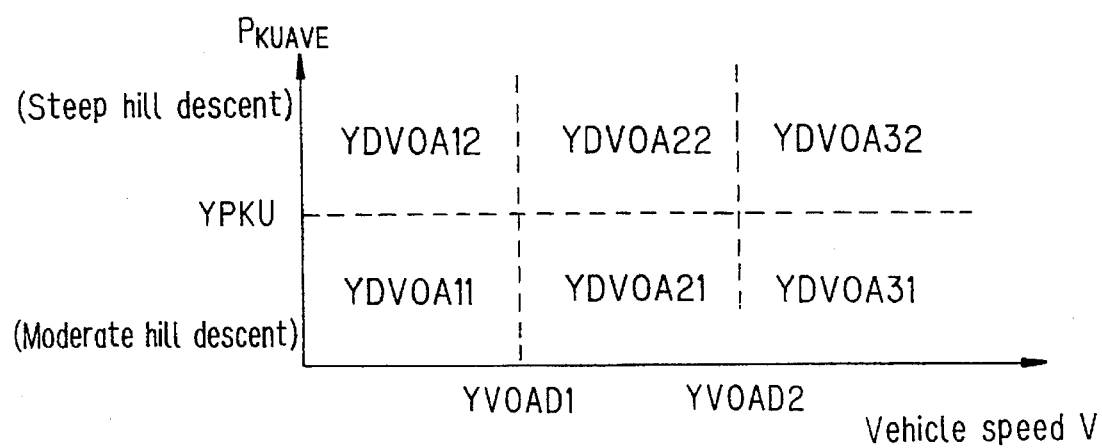
FIG. 25 is an explanatory view showing the characteristics of deceleration data YDVOAmn used in FIG. 22(23) flow chart.

FIG. 25 shows the characteristics of the degree of deceleration data. As illustrated, the degree of deceleration data is predetermined with respect to vehicle speed V and the average value PKUAVE in the hill descent direction. More precisely, vehicle speed V is classified into three regions by the first and second predetermined vehicle speeds YVOAD1,2, while the average value PKUAVE indicative of the degree of hill descent is classified into two regions by the predetermined value YPKU, whereby six regions are prepared. The degree of deceleration data YDVOAmn are separately defined for individual regions. The degree of deceleration data are set to be YDVOAm1<YDVOAm2
YDVOA1n<YDVOA2n<YDVOA3n The degree of deceleration data are compared with the actual degree of deceleration data DTV at step S750 as mentioned above and if it is determined as a rapid deceleration, the map number is incremented at step S712 such that map is switched from the level-road running map (#2) to the moderate hill descent map (#3), or from the moderate hill descent map (#3) to the steep hill descent map (#4). The map having wider lower gear breadth is accordingly selected, whereby downshifting is facilitated.

Figure 26:
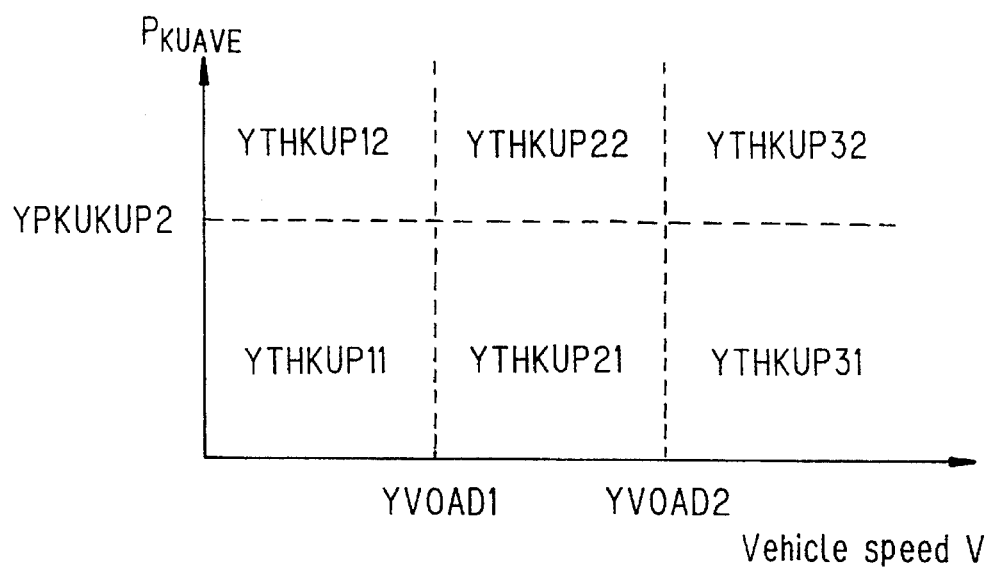
FIG. 26 is an explanatory view showing the characteristics of reference values YTHKUPmn for map switching used in the flow chart of FIG. 22(23)

The program next passes to step S752 which determines whether or not the selected map (number) is 4 (for steep hill descent), and if it is, to steps 754 to S774 which compare the current vehicle speed V with the aforesaid first and second predetermined vehicle speed YVOAD1,2 and at the same time, compare the average value PKUAVE in the hill descent direction with the other predetermined value YPKUKUP 2, and based on the result of the comparison, select one among the data YTHKUPmn of FIG. 26 as a reference value of throttle opening for comparison. The values YTHKUPmn are separately predetermined in a manner similar to the degree of deceleration data in six regions of hill descent condition defined by vehicle speed V and the average value PKUAVE in the hill descent direction. The program passes to step S776 which determines whether or not the throttle opening TH is equal to or larger than a prescribed value THREF (the specific value of THREF being (2/8)×WOT [°]), and if it is, to step S778 in which rewriting of the map (number) to 3 (map for moderate hill descent) is forced. This is conducted because the circumstances show that the driver wants to accelerate, i.e. does not want to use the engine braking effect, notwithstanding that the vehicle is traveling down a steep hill.

Figure 27:
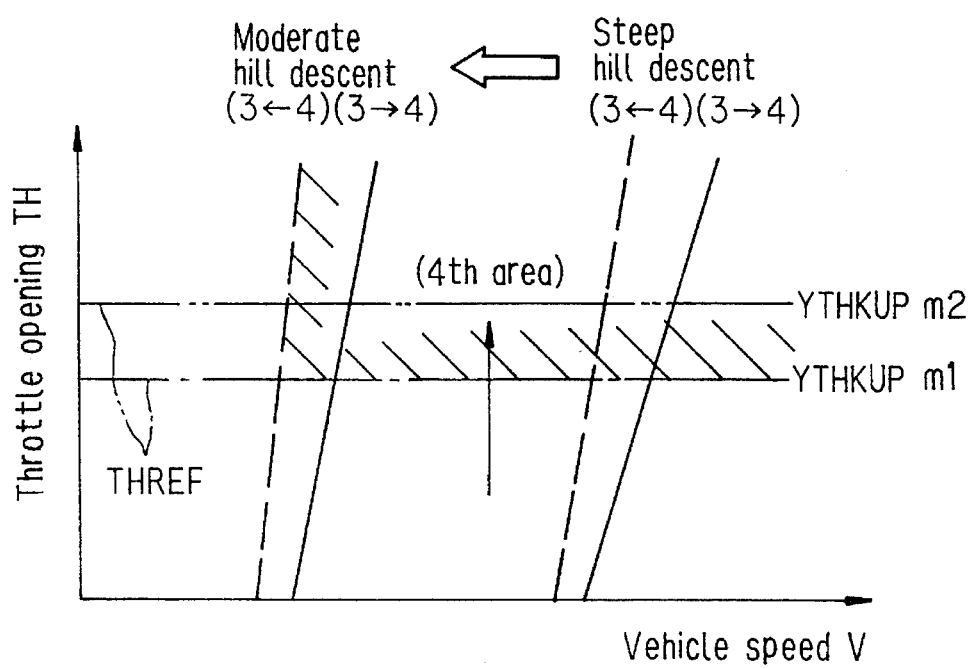
FIG. 27 is an explanatory view showing the characteristics of the third-gear range and the fourth gear range in the maps for moderate hill descent and for steep hill descent.

To be more specific, the third-gear range in the steep hill descent map is made further broader than the moderate hill descent map as shown in FIG. 27. If the steep hill descent map is selected, as a result, third gear is frequently used. As explained earlier, on the other hand, the necessity of engine braking is not high when running down a moderate hill and still less, a use of lower gear causes engine speed higher, which makes engine noisier. In view of the above, it is presumed in the embodiment that the driver does not want the engine braking if the throttle valve is opened more greatly than or equal to the value THREF. Rather, he does presumably expect an acceleration at such an instance. It is therefore arranged that the map is switched to map (number) 3 for moderate hill descent. As a result, the gear will possibly be shifted up to fourth as illustrated in the figure, a drive feeling will be improved during moderate hill descending. Furthermore, since the reference value for comparison is varied with vehicle speed and downhill grade, the gear can optimally be upshifted. It should be noted that the characteristics depicted in the figure is simplified for ease of understanding.

The program next passes to step S780 in the flow chart to determine if the determined map is 0 (for steep hill climbing) or 1 (for moderate hill climbing) and if it is, to step S782 in which the bit of a flag MFZY is set to 1, while if not, to step S784 in which the bit of the flag is reset to 0. This will be explained below.

On completion of the subroutine of FIG. 23, the program passes to step 24 of the flow chart of FIG. 2 in which a gear S1 of possible minimum gear and a gear S2 of possible maximum gear are decided based on the selected map (the one to be switched to or held).

Figure 28:
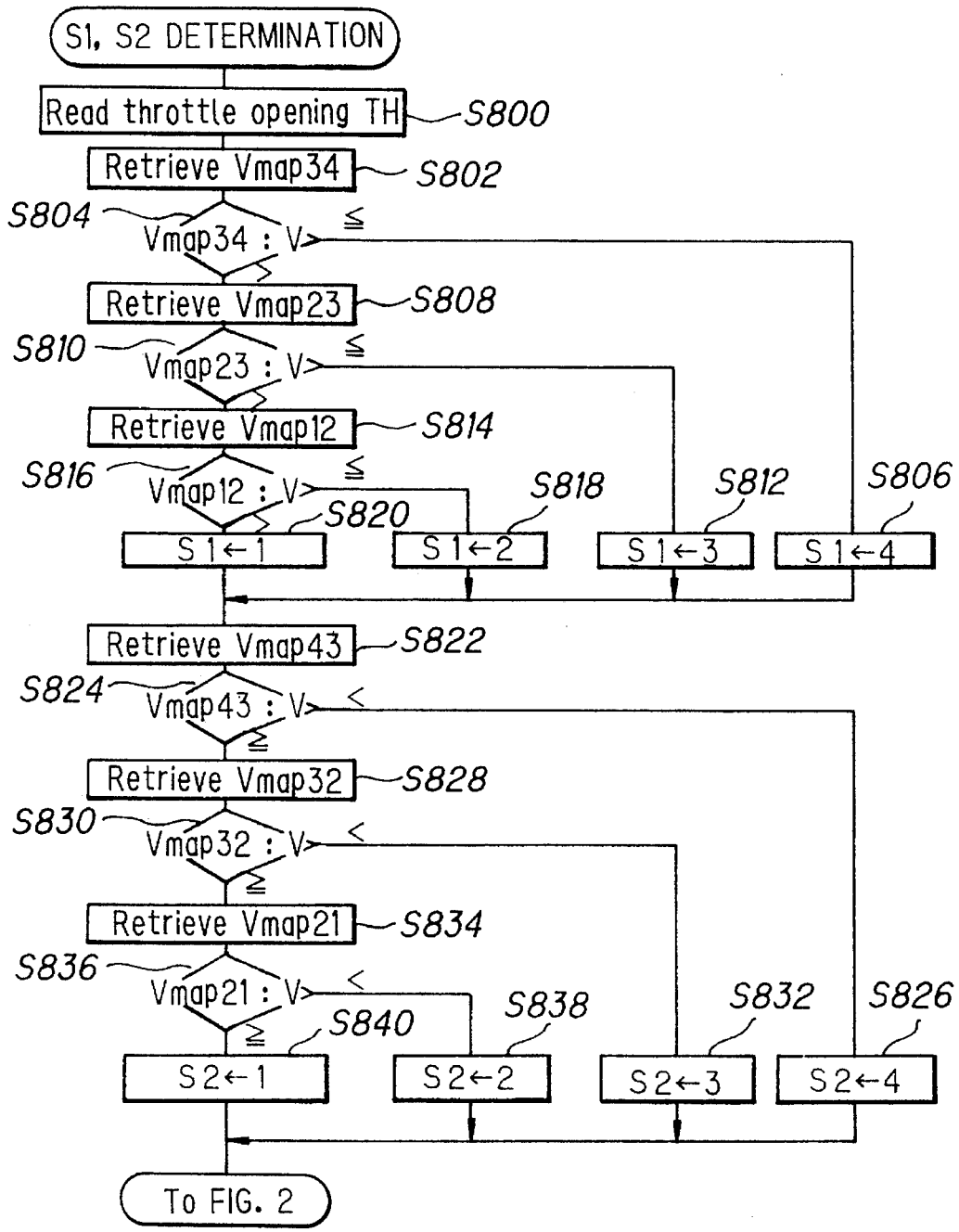
FIG. 28 is a flow chart of a subroutine of FIG. 2 flow chart showing the determination of possible minimum and maximum gears.

FIG. 28 shows this. The program begins at step S800 in which the detected throttle opening TH is read out, and moves to step S802 in which a boundary vehicle speed Vmap34 for upshifting from third to fourth gear corresponding thereto is retrieved. More specifically, the gear shift scheduling maps are defined in advance with respect to the throttle opening and vehicle speed as was illustrated in FIGS. 5 and 6. Since the vehicle speed is defined with respect to the throttle opening and is varied relative to the throttle opening, thus, by detecting the throttle opening, it suffices for determining the vehicle speed corresponding thereto. Thus, the vehicle speed functions as a boundary value for upshifting. This will also be applied to downshifting.

The program then moves to step S804 in which the retrieved boundary vehicle speed Vmap34 for upshifting is compared with the current (i.e., detected and actual) vehicle speed V and if the current vehicle speed is found to exceed the boundary value, the possible minimum gear S1 is assumed to be fourth. On the other hand, if step S804 finds that the current vehicle speed V is less than the boundary value Vmap34, the program passes to step S808 in which another upshifting boundary value Vmap23 from second to third gear is retrieved and to step S810 in which the value Vmap23 is compared with the current vehicle speed V. If the current vehicle speed V is found to be not less than the value Vmap23, the program passes to step S812 in which the possible minimum gear S1 is determined to be third. If step S810 finds that the current vehicle speed V is less than the value Vmap23, the program passes to step S814 in which still another upshifting boundary value Vmap12 from first to second gear is retrieved, to step S816 to S820 in which the possible minimum gear S1 is determined.

The program next passes to steps S822 to S840 to retrieve boundary values Vmap43, 32, 21 for downshifting from the detected throttle opening and compare with the current vehicle speed V to determine the possible maximum gear S2. The reason why the two possible gears S1 and S2 are determined here is that, since the gear shift pattern has a hysteresis both in upshifting and downshifting so that two candidates would occur if the throttle opening is positioned between the upshifting and downshifting boundary values. In order to solve the problem, the two possible gears are initially determined to finally decide it at a later stage.

Returning to the flow chart of FIG. 2, the program next passes to step S26 in which a correction coefficient FK is determined through fuzzy reasoning and the determined coefficient is then multiplied to the current vehicle speed V to obtain a corrected vehicle speed VFZY.

FIG. 29 shows fuzzy production rules to be used in the inference. As illustrated, the reasoning or inference of the correction coefficient FK is conducted using the current vehicle speed V (0 to 200 km/h), the current throttle opening TH ((0/8 to 8/8)×WOT [°]) and the driving resistance R (m/s$^2$) as parameters. As the driving resistance, the average value PNOAVE in the hill climbing direction is used. Explaining the rules, Rule 1 is a basic rule in which the correction coefficient FK is made 1.0 (i.e., not corrected) no matter how the current vehicle speed V and throttle opening TH and driving resistance R are. Rules 2 to 4 are subject to specific vehicle running conditions and are different from each other only in the throttle opening.

Figure 30:
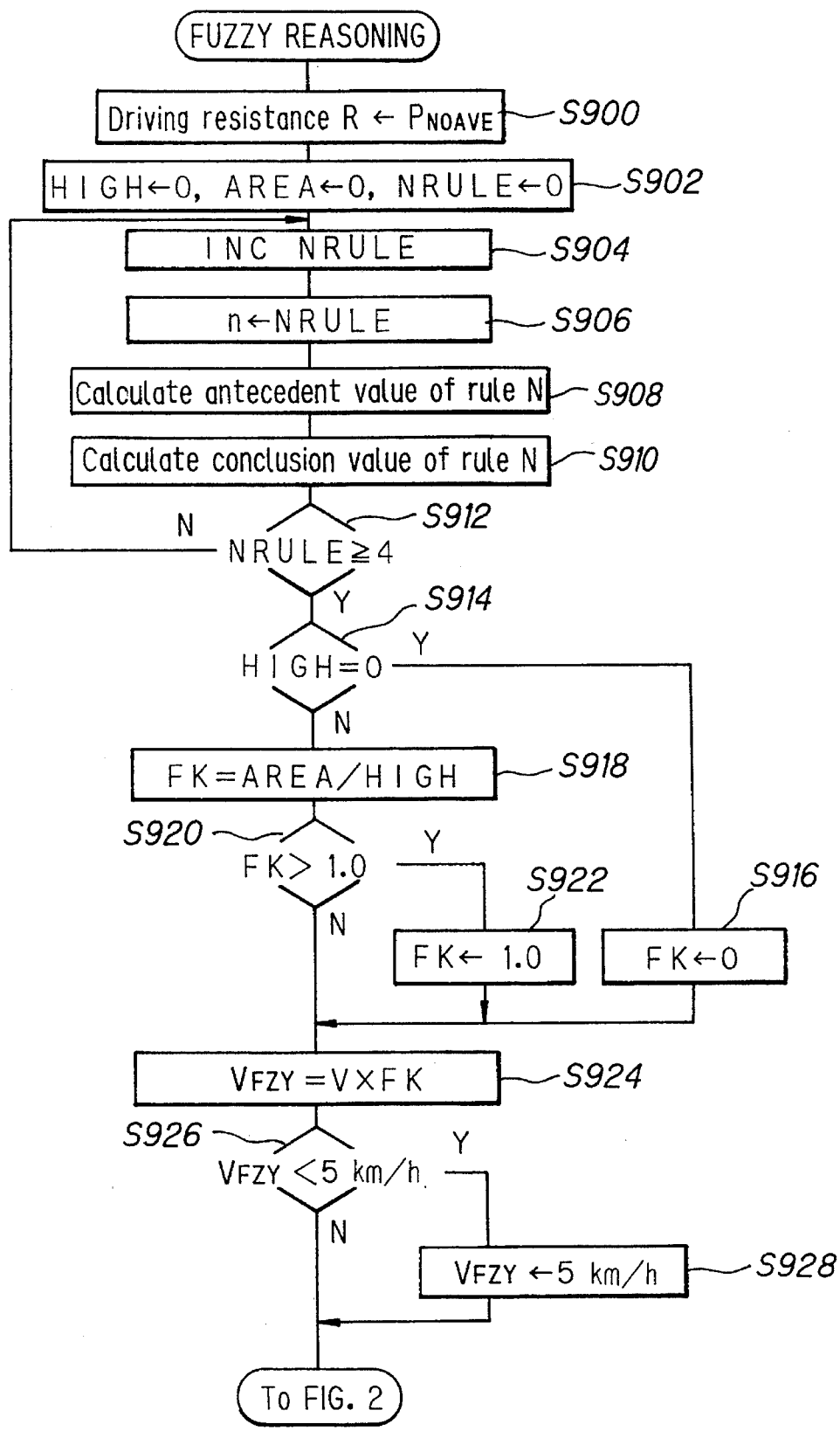
FIG. 30 is a flow chart of a subroutine of FIG. 2 flow chart showing the correction of vehicle speed through the fuzzy reasoning.

The fuzzy reasoning or inference will be explained with reference to the flow chart of FIG. 30. The program starts at step S900 in which the aforesaid average value PNOAVE in the hill climbing direction is renamed as the driving resistance R, to step S902 in which calculation tables HIGH, AREA and a counter NRULE (rule number counter) are initialized, to step S904 in which the rule number counter NRULE is incremented, to step S906 in which the counter value NRULE is rewritten as n, to step S908 in which the value of the antecedent of rule n (here Rule 1) is calculated, to step S910 in which the value of the conclusion is calculated, to step S912 in which the counter value NRULE is compared with 4. The procedures from S904 to S910 are repeated for the whole rules until step S912 finds that the counter value has reached 4.

Figure 31:
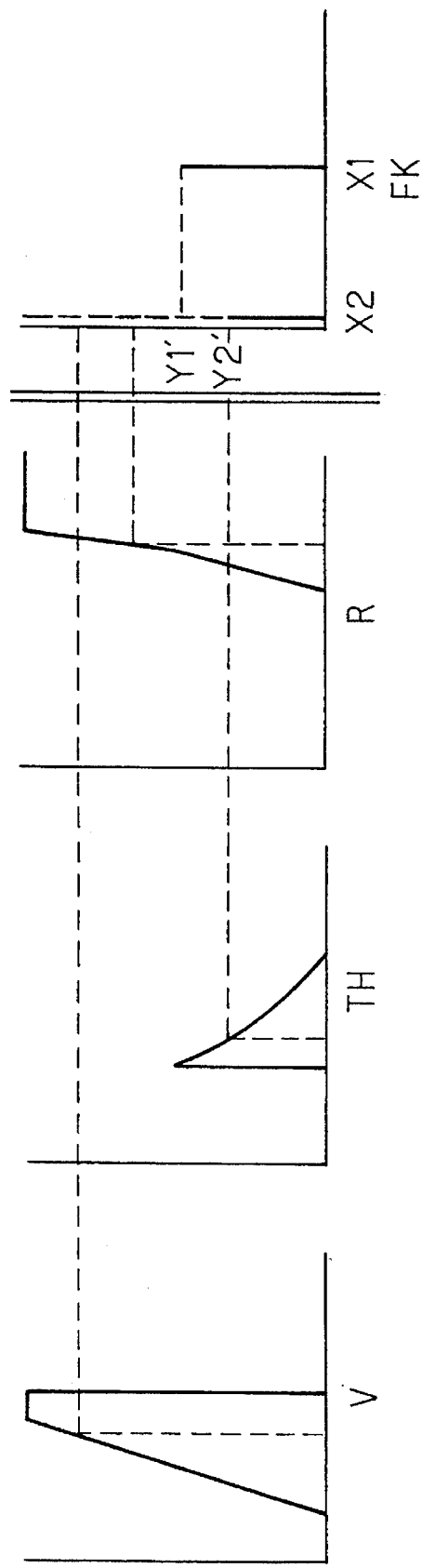
FIG. 31 is an explanatory view showing the fuzzy reasoning for vehicle speed correction of the flow chart of FIG. 30.

Explaining the above referring to FIG. 31, the above means to calculate for the antecedent the grade (height HIGH) from the least membership function among the three parameters, and then to calculate the area AREA. And, by dividing the area AREA by height HIGH to obtain the center of gravity, the inferred value (correction coefficient FK) is obtained therefrom. These calculations are repeated for the 4 rules and the resultant values are accumulated.

The program then passes to step S914 in which it is confirmed if the height HIGH is zero and if it is, to step S916 in which the coefficient is made zero in order to avoid a situation of division by zero. If the decision at step S914 is negative, the program passes to step S918 in which the center of gravity is calculated to obtain the coefficient FK, to step S920 in which the obtained coefficient is compared with 1.0 and if the coefficient is found to exceed 1.0, to step S922 in which the coefficient FK is limited to 1.0. Namely, the correction of the current vehicle speed V is conducted only for the decreasing direction. The program next passes to step S924 in which the detected vehicle speed V is multiplied by the coefficient FK to obtain the corrected vehicle speed VFZY, to step S926 in which the obtained corrected vehicle speed VFZY is compared with a lower limit such as 5 km/h. If the step finds that the corrected vehicle speed VFZY is less than the lower limit, since this means that it exceeds the resolving power of the vehicle speed sensor, the program passes to step S928 in which the corrected vehicle speed VFZY is restricted to the lower limit.

Returning to the flow chart of FIG. 2, the program passes to step S28 in which a possible minimum gear S1F for fuzzy reasoning is determined by retrieving the level-road running map using the corrected vehicle speed VFZY and the detected throttle opening TH as address data and the aforesaid value S1 is replaced by S1F.

Figure 32:
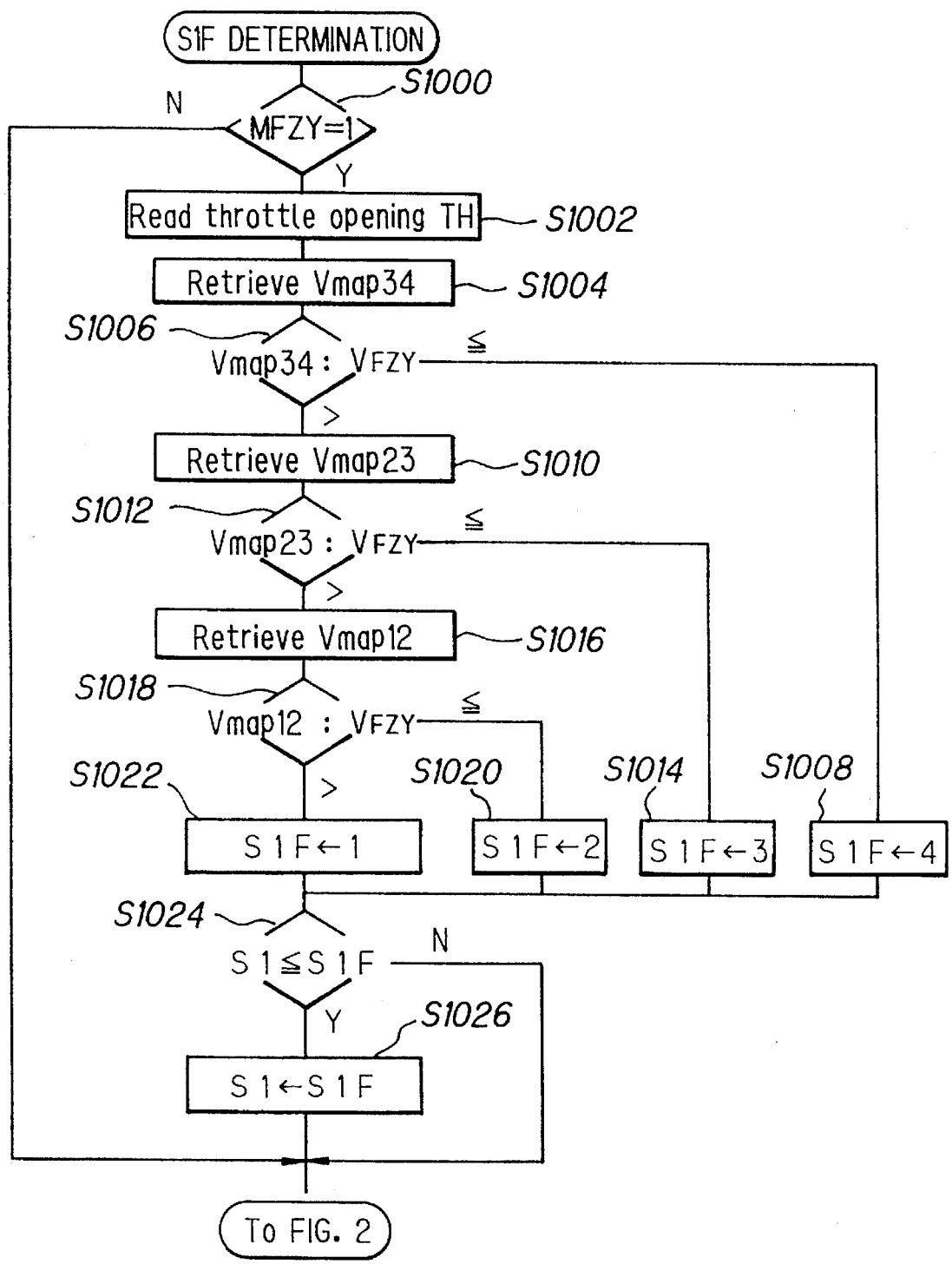
FIG. 32 is a flow chart of a subroutine of FIG. 2 flow chart showing the determination of another possible minimum gear using the corrected vehicle speed.

This will be explained with reference to the flow chart of FIG. 32. The program starts at step S1000 in which it is checked if the aforesaid flag MFZY's bit is set to 1, i.e., it is checked if the steep hill climbing map or the moderate hill climbing map is selected and if not, the program is immediately terminated. Since, as will be aware from the fact that the parameter used as the driving resistance is the average value PNOAVE in the hill climbing direction, and not the average value PKUAVE in the hill descent direction, the procedures are only conducted if either of the hill climbing map is selected, and is conducted only in the direction of upshifting as will be understood as the explanation goes on.

If the decision at step S1000 is affirmative, the program passes to step S1002 in which the current throttle opening TH is again read out, to steps S1004 to S1022 in which any of the upshifting boundary vehicle speeds Vmap34, 23, 12 corresponding to the current throttle opening is obtained from the level-road running map and is compared with the corrected vehicle speed VFZY to determine the possible minimum gear S1F obtained through fuzzy reasoning. The program next moves to step S1024 in which the possible minimum gear S1F is compared with the aforesaid gear S1 and if S1≦S1F, to step S1026 in which S1F is replaced by S1, while if S1>S1F, step S1026 is skipped so as not to conduct the replacement.

Explaining this with reference to FIG. 5, to correct the actual vehicle speed V and to compare it with the upshifting boundary vehicle speed to determine a gear is, stated reversey, equal to shift the boundary vehicle speed itself within a range up to the boundary vehicle speed in the moderate (or steep) hill descent map. In addition, to correct the actual vehicle speed V through fuzzy reasoning using parameters including the driving resistance and to retrieve the level-road running map using the corrected vehicle speed as address datum means that the gear shift characteristics are optimally varied in a range in response to the parameters including the driving resistance. The reason why step S1026 is skipped, i.e., the reason why the range is limited to the boundary vehicle speed in the moderate ate (steep) hill descent map in the case of S1>S1F is, the value in the moderate (steep) hill climbing map basically defines the gear shift characteristics during hill climbing.

Returning to the flow chart of FIG. 2, the program passes to step S30 in which a desired gear is finally determined from the current gear S0 and the possible minimum and maximum gears S1, S2. This will be briefly stated that, as was experienced in the procedures mentioned in connection with FIGS. 22 and 23, the current gear, i.e., the desired gear is determined such that they are possible minimum gear S1≦current gear S0≦possible maximum gear S2.

Figure 33:
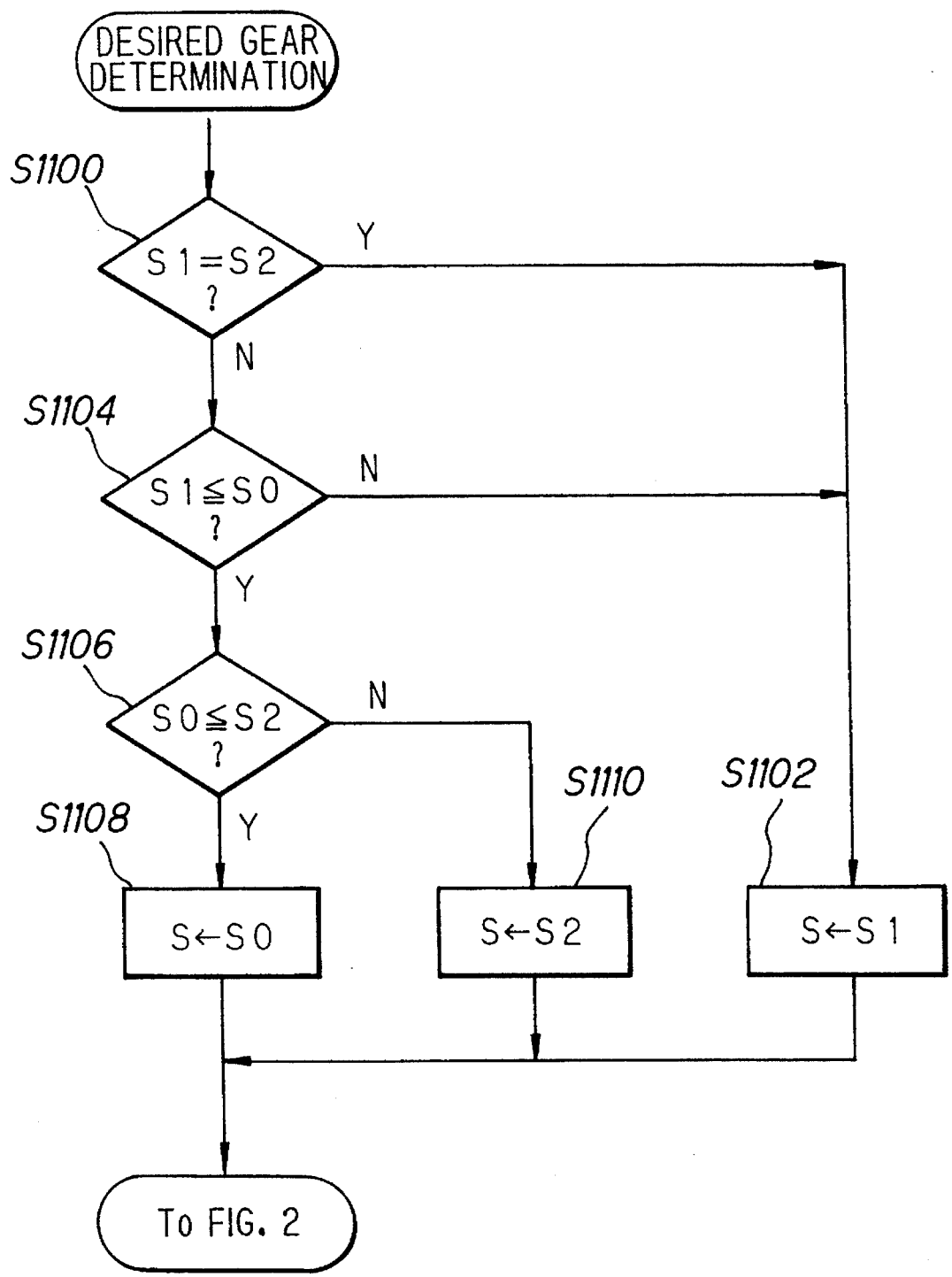
FIG. 33 is a flow chart of a subroutine of FIG. 2 flow chart showing the determination of a desired gear.

FIG. 33 is a flow chart of a subroutine for carrying out the procedures. First in step S1100, it is checked if the possible minimum gear S1 and the possible maximum gear S2 are equal to each other and if it is, the program advances to step S1102 in which the possible minimum gear S1 is accordingly rewritten as the desired gear S. If the decision at step S1100 is negative, the program passes to step S1104 in which it is checked if the current gear S0 is equal to or greater than the possible minimum gear S1 and if it is, to step S1106 in which the current gear S0 is equal to or smaller than the possible maximum gear S2. If the decision is also affirmative in the step, since this means that the current gear S0 is positioned between the possible minimum and maximum gears and it suffice if the gear is kept in the position, the program passes to step S1108 in which the current gear S0 is rewritten as the desired gear S. If step S1104 finds that the current gear S0 is less than the possible minimum gear S1, since it becomes necessary to upshift to the possible minimum gear S1, the program passes to step S1102 in which the possible minimum gear S1 is rewritten as the desired gear S. On the other hand, if the current gear S0 is found to exceed the possible maximum gear S2, since it becomes necessary to shift down to the possible maximum gear S2, the program advances to step S1110 in which the possible maximum gear S2 is rewritten as the desired gear S.

Returning to the flow chart of FIG. 2, the program advances to step S32 in which the solenoids 54, 56 are energized/deenergized such that the gear becomes the desired gear S.

As will be understood from the foregoing description, the present embodiment of the invention calculates the predicted acceleration as an index of the vehicle running resistance, compares the predicted acceleration with the actual acceleration, estimates the road profile (slope) from the result of the comparison, and switches among level-road running, hill climbing and hill descent maps based on the estimated road profile, whereby a gear can optimally determined in an entire vehicle running condition.

Further, the present embodiment of the invention selects one among a plurality of gear shift scheduling maps including level-road running one in response to the driving resistance and using the parameters including the driving resistance, conducts fuzzy reasoning to correct the detected (current) vehicle speed, and with the use of the corrected vehicle speed, the level-road running map is retrieved to determine a gear to be shifted to within a range allowed in the map. As a result, it becomes possible to change the characteristics of gear shift scheduling within a range allowed by the running condition and hence it becomes possible to conduct an optimum vehicle automatic transmission control without causing the driver to suffer from unpleasant feeling.

Furthermore, since the actual acceleration is corrected in response to the altitude of a place where the vehicle is traveling when the engine output torque decreases due to the charging efficiency drop, the road profile, in particular the road profile during hill climbing can be appropriately estimated. As a result, map selection is conducted in an appropriate manner and gear can be determined appropriately.

It should be noted that although the actual acceleration is corrected to increase in the above, it is alternatively possible to correct the predicted acceleration to decrease in response to the detected altitude, or is still alternatively possible to conduct these corrections at the same time.

It should further be noted that although the altitude is detected through atmospheric pressure, it is alternatively possible to detect it by any other means.

It should still further be noted that although gear shifting control is conducted through fuzzy reasoning, the present invention can also be applied to the control without using the fuzzy reasoning.

While five types of maps are used in the embodiments explained in the foregoing, it is alternatively possible to reduce the number of maps used by using the same map for moderate hill climbing and moderate hill descent. It is also alternatively possible to use only a single map and to adjust the characteristics in accordance with the average value of the difference between the predicted acceleration and the actual acceleration.

In addition, while the described embodiments use the acceleration as parameter indicating running resistance, the invention is not limited to this and it is alternatively possible to use any other parameter which provides an index of the running resistance, particularly of the slope resistance. Further, while the actual acceleration was calculated from the vehicle speed, it is alternatively possible to employ an acceleration sensor for detecting it directly.

As the parameter indicating engine load it is alternatively possible to use the amount of depression of the accelerator pedal instead of the throttle opening used in the described embodiments.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an automatic transmission of a vehicle, having an internal combustion engine connected to said automatic transmission for driving one or more wheels of said vehicle, comprising:

a hydraulic control circuit connected to said automatic transmission;

an electronic control means for controlling said automatic transmission through said hydraulic control circuit;

a load detecting means for detecting an operating load on said engine and sending a first output signal representing the engine load to said electronic control means;

a vehicle speed detecting means for detecting the vehicle speed and sending a second output signal representing the vehicle speed to said electronic control means;

an altitude detecting means for detecting the altitude of a place where said vehicle travels and sending a third output signal representing the altitude to said electronic control means;

wherein said electronic control means computes an index indicative of a driving resistance of the vehicle based at least on said second signal, and compares said index with a predetermined reference value stored in a memory in said electronic control means to determine if the vehicle is hill climbing or hill descending;

wherein said electronic control means actuating said hydraulic control circuit for carrying out gear shifting control including changing the gear shifting characteristics of said transmission to be suitable for either hill climbing or hill descending based on said determination; and wherein said electronic control means corrects at least one of said index indicative of a driving resistance of the vehicle and said predetermined reference value to be compared therewith in response to said third output signal.

2. A system according to claim 1, wherein said electronic control means corrects said index indicative of a driving resistance of the vehicle in response to said third output signal such that said index increases with increasing altitude.

3. A system according to claim 1, wherein said electronic control means corrects said reference value to be compared with said index in response to said third output signal such that said reference value decreases with increasing altitude.

4. A system according to claim 2, wherein said electronic control means corrects said index indicative of a driving resistance of the vehicle in response to said third output signal at a speed which increases with increasing altitude.

5. A system according to claim 3, wherein said electronic control means corrects said reference value to be compared with said index in response to said third output signal at a speed which increases with increasing altitude.

* * * * *